(12) United States Patent
Salvesen et al.

(10) Patent No.: US 8,201,651 B2
(45) Date of Patent: Jun. 19, 2012

(54) AUTOMOBILE OVER-BULKHEAD AIR INTAKE SYSTEM

(75) Inventors: Clifford Randall Salvesen, Ostrander, OH (US); Jacob William Weaver, Marysville, OH (US); Anthony John Leanza, Powell, OH (US); Brian Christopher Bray, Powell, OH (US); Joshua L. Morrow, Dublin, OH (US); Timothy T. Laakso, Marysville, OH (US); Kerry Stephen McClure, Dublin, OH (US); Nicholas Goldsberry, Hilliard, OH (US); Thomas Brent Tarr, Bowie, TX (US); Kim Ross, Valcourt (CA); Raymond Khouw, Dublin, OH (US); Takeshi Hagiwara, Dublin, OH (US); Ryan Chapman, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/755,894

(22) Filed: Apr. 7, 2010

(65) Prior Publication Data

US 2011/0017535 A1    Jan. 27, 2011

Related U.S. Application Data

(63) Continuation-in-part of application No. 11/754,942, filed on May 29, 2007, which is a continuation of application No. 10/887,851, filed on Jul. 12, 2004, now Pat. No. 7,237,635.

(60) Provisional application No. 61/167,353, filed on Apr. 7, 2009.

(51) Int. Cl.
*B60K 13/02* (2006.01)
(52) U.S. Cl. ...................................................... 180/68.3
(58) Field of Classification Search ................. 180/68.1, 180/68.2, 68.3
See application file for complete search history.

(56) References Cited

U.S. PATENT DOCUMENTS

| | | | |
|---|---|---|---|
| 1,846,283 A | 2/1932 | Summers |
| 1,957,919 A | 5/1934 | Tice |
| 2,197,503 A | 4/1940 | Martin |
| 2,684,204 A | 7/1954 | Lamb |
| 2,881,860 A | 4/1959 | Ternes |
| 2,913,065 A | 11/1959 | Lyon, Jr. |
| 3,696,730 A | 10/1972 | Masuda et al. |

(Continued)

FOREIGN PATENT DOCUMENTS
JP    S61104233    7/1986
(Continued)

OTHER PUBLICATIONS

Office Action of U.S. Appl. No. 12/816,910 dated Oct. 28, 2010.
(Continued)

*Primary Examiner* — Katy M Ebner
(74) *Attorney, Agent, or Firm* — Rankin Hill & Clark LLP

(57) ABSTRACT

A vehicle air intake system includes a grille disposed along the front portion of an engine compartment, a hood disposed over the engine compartment and a bulkhead cover disposed in the engine compartment below the hood. The bulkhead cover has a bulkhead cover intake port and a deflector disposed along and extending forwardly from a lower portion of the bulkhead cover intake port to circuitously redirect airflow passing from the grille to the bulkhead cover intake port.

22 Claims, 20 Drawing Sheets

U.S. PATENT DOCUMENTS

| | | | |
|---|---|---|---|
| 3,948,234 A | 4/1976 | Shumaker, Jr. | |
| 3,987,862 A | 10/1976 | Lidstone | |
| 4,164,262 A | 8/1979 | Skatsche et al. | |
| 4,420,057 A | 12/1983 | Omote et al. | |
| 4,533,012 A * | 8/1985 | Komoda | 180/68.3 |
| 4,548,166 A | 10/1985 | Gest | |
| 4,778,029 A | 10/1988 | Thornburgh | |
| 4,878,555 A | 11/1989 | Yasunaga et al. | |
| 4,932,490 A | 6/1990 | Dewey | |
| 4,971,172 A | 11/1990 | Hoffman et al. | |
| 5,022,479 A | 6/1991 | Kiser et al. | |
| 5,054,567 A | 10/1991 | Hoffman | |
| 5,195,484 A | 3/1993 | Knapp | |
| 5,251,712 A | 10/1993 | Hayashi et al. | |
| 5,417,177 A | 5/1995 | Taguchi et al. | |
| 5,564,513 A | 10/1996 | Wible et al. | |
| 5,660,243 A | 8/1997 | Anzalone et al. | |
| 5,794,733 A | 8/1998 | Stosel et al. | |
| 5,860,685 A | 1/1999 | Horney et al. | |
| 5,881,479 A | 3/1999 | Pavey | |
| 6,056,075 A | 5/2000 | Kargilis | |
| 6,059,061 A | 5/2000 | Economoff et al. | |
| D433,656 S | 11/2000 | Hanagan et al. | |
| 6,276,482 B1 | 8/2001 | Moriya et al. | |
| 6,302,228 B1 | 10/2001 | Cottereau et al. | |
| 6,453,866 B1 | 9/2002 | Altmann et al. | |
| 6,484,835 B1 | 11/2002 | Krapfl et al. | |
| 6,510,832 B2 | 1/2003 | Maurer et al. | |
| 6,564,768 B2 | 5/2003 | Bauer et al. | |
| 6,804,360 B1 | 10/2004 | Misawa et al. | |
| 6,805,088 B2 | 10/2004 | Tachibana et al. | |
| 6,880,655 B2 | 4/2005 | Suwa et al. | |
| 7,059,439 B2 * | 6/2006 | Storz et al. | 180/68.1 |
| 7,237,635 B2 | 7/2007 | Khouw et al. | |
| 2002/0059912 A1 | 5/2002 | Bauer et al. | |
| 2002/0078916 A1 | 6/2002 | Altmann et al. | |
| 2002/0088656 A1 | 7/2002 | Bergman | |
| 2003/0042055 A1 | 3/2003 | Suwa et al. | |
| 2003/0106730 A1 * | 6/2003 | Dennison et al. | 180/68.1 |
| 2003/0188902 A1 | 10/2003 | Decuir | |
| 2004/0108152 A1 | 6/2004 | Storz et al. | |
| 2004/0231900 A1 | 11/2004 | Tanaka et al. | |
| 2005/0023057 A1 | 2/2005 | Maeda et al. | |
| 2005/0076871 A1 | 4/2005 | Paek | |
| 2005/0230162 A1 | 10/2005 | Murayama et al. | |
| 2006/0006011 A1 | 1/2006 | Khouw et al. | |

FOREIGN PATENT DOCUMENTS

| | | | |
|---|---|---|---|
| JP | 62110023 | | 5/1987 |
| JP | 62-110023 | | 7/1987 |
| JP | S6374334 | | 5/1988 |
| JP | 1122998 | | 5/1989 |
| JP | 7-4133 | | 1/1995 |
| JP | 08-177658 | | 7/1996 |
| JP | H09136551 | | 5/1997 |
| JP | 11-294279 | * | 10/1999 |
| JP | H11294279 | | 10/1999 |
| JP | 200120813 | | 1/2001 |
| JP | 2004-190671 | | 7/2004 |
| JP | 2004183514 | | 7/2004 |
| JP | 2005-297888 | | 10/2005 |
| WO | 0023696 | | 4/2000 |

OTHER PUBLICATIONS

2002 Honda CR-V AWD SE 5DR photographs, pp. 1-9.
Honda Web Parts Catalog—v2.2.2, Apr. 2010 showing intake assembly for 2002 Honda CR-V.
Detroit 2002 Mitsubishi Montero Limited 4wd—Center View photograph.
Detroit 2002 BMW X5—Center View photograph.
2002 Nissan Murano—Center View photograph.
NY 2002 Infiniti G35—Center View photograph.
Frankfurt 1999 Mazda 323 1.5 S Exclusive—Center View photograph.
Detroit 2002 Nissan Altima 2.5 S—Engine Open Door photograph.
Office Action of U.S. Appl. No. 12/816,910 dated Oct. 20, 2011.
Office Action of U.S. Appl. No. 11/754,942 dated Jul. 30, 2009.
Office Action of U.S. Appl. No. 11/754,942 dated Feb. 2, 2010.
Office Action of U.S. Appl. No. 11/754,942 dated Feb. 28, 2011.
Office Action of U.S. Appl. No. 12/816,926 dated Mar. 1, 2011.
Office Action of U.S. Appl. No. 12/816,910 dated May 13, 2011.
Office Action of U.S. Appl. No. 12/816,926 dated Aug. 15, 2011.
Office Action of U.S. Appl. No. 11/754,942 dated Aug. 17, 2011.
Office Action of U.S. Appl. No. 12/816,926 dated Jan. 25, 2012.
Office Action of U.S. Appl. No. 12/816,910 dated Apr. 5, 2012.

* cited by examiner

AUTOMOBILE OVER-BULKHEAD AIR INTAKE SYSTEM

This application claims the benefit of provisional patent application Ser. No. 61/167,353, filed Apr. 7, 2009; which is expressly incorporated herein by reference. This application is also a continuation-in-part application of U.S. application Ser. No. 11/754,942 filed on May 29, 2007, which itself is a continuation of U.S. application Ser. No. 10/887,851 filed on Jul. 12, 2004, now issued as U.S. Pat. No. 7,237,635, all expressly incorporated herein by reference.

BACKGROUND

This disclosure relates generally to an automobile air intake system. More particularly, the disclosure relates to an automobile over-bulkhead air intake system and a method for drawing air into a combustion engine.

Air intake systems provide necessary air to internal combustion engines to aid in the combustion process. Conventional intake systems either draw air from inside the engine compartment, or they draw air from outside the vehicle via an exterior intake port. Systems designed where the air is drawn from inside the engine compartment commonly suffer a drawback of drawing in warmer and less dense air than exterior air. This reduces the efficiency of the engine compared with the use of cooler exterior air. A solution to address the shortcoming of these systems is to draw in cooler exterior air. However, systems designed where the air is drawn in via an exterior intake port commonly suffer a drawback of drawing in air that includes water or particles, which can block the engine intake, inhibit airflow, or damage the engine. Solutions have been proposed to address the shortcomings of these exterior intake port systems.

U.S. Pat. No. 5,564,513 to Wible et al. discloses an exterior air intake system for an internal combustion engine that includes an intake port disposed under the vehicle hood in front of the radiator. The intake port includes a filter for removing solid particulates from the intake air and for separating water from the air. The intake port, however, requires a large space forward of the radiator under the hood of the vehicle, which is difficult to fit within the compact engine compartments of contemporary vehicles. Further, due to the filter's proximity to the exterior opening of the port, the filter may have a propensity to clog quickly to inhibit airflow and may require frequent changing.

U.S. Pat. No. 6,510,832 issued to Maurer et al. discloses an exterior air intake system for an internal combustion engine that is aimed at avoiding water intake by providing a main air inlet to exterior air, an auxiliary air inlet, a moisture sensor, and an electric valve to close the main air inlet. When moisture is sensed in the main inlet, the electric valve closes the main inlet and air is drawn from the engine compartment into the auxiliary air inlet. The Maurer system, however, requires pneumatic or electro-pneumatic drives and an electrical moisture sensor. These complicated elements may be subject to an increased chance of failure.

U.S. Pat. No. 5,022,479 to Kiser et al. discloses a rectangular channel formed in the vehicle hood that includes a forward ambient air inlet and a rear air outlet. The channel includes a series of baffles to capture moisture from air flowing therethrough. A sealing sleeve is provided to bridge between the channel and the engine air cleaner. The Kiser system has drawbacks in that it occupies a large amount of hood space and relies upon a special sleeve design to connect with the air cleaner system.

U.S. Pat. No. 4,971,172 to Hoffman et al. discloses air ducts formed in the hood of a truck to eliminate water and heavier particles from the air stream. The intake pathway includes vertical ducts with drainholes to permit the drainage of water collected in the pathway. The intake pathways occupy a large amount of hood space and create a long conduit to the intake system, which inhibits efficient airflow.

Accordingly, a need exists for an improved air intake system. In addition, a need exists for a method of efficiently obtaining cool exterior air for an internal combustion engine having low moisture and/or particulate content.

SUMMARY

According to one aspect, a vehicle air intake system is provided. More particularly, in accordance with this aspect, the vehicle air intake system includes a grille disposed along the front portion of an engine compartment, a hood disposed over the engine compartment and a bulkhead cover disposed in the engine compartment below the hood. The bulkhead cover has a bulkhead cover intake port and a deflector disposed along and extending forwardly from a lower portion of the bulkhead cover intake port to circuitously redirect airflow passing from the grille to the bulkhead cover intake port.

According to another aspect, an air intake system is provided for a vehicle. More particularly, in accordance with this aspect, the air intake system includes a grille disposed along the front portion of the engine compartment and having apertures therein for receiving airflow. A hood is disposed over the engine compartment. A bulkhead cover is received in the engine compartment and defines a bulkhead cover intake port for receiving intake air for an engine of the vehicle. An airflow passage extends from the grille to the bulkhead cover intake port for delivering airflow received through the apertures of the grille to the bulkhead cover intake port. An extension protrudes from a lower portion of the bulkhead cover to circuitously form the airflow passage for inhibiting liquid and debris from reaching the bulkhead cover intake port.

According to still another aspect, a vehicle air intake bulkhead cover is provided. More particularly, in accordance with this aspect, the vehicle air intake bulkhead cover includes a base and a plurality of walls. The walls and the base form an airflow channel through the bulkhead cover having a first end in which a bulkhead cover intake port is defined and a second end. A deflector protrudes from the base below the bulkhead cover intake port to obstruct direct airflow into the bulkhead cover intake port.

DETAILED DESCRIPTION

Figure 1:
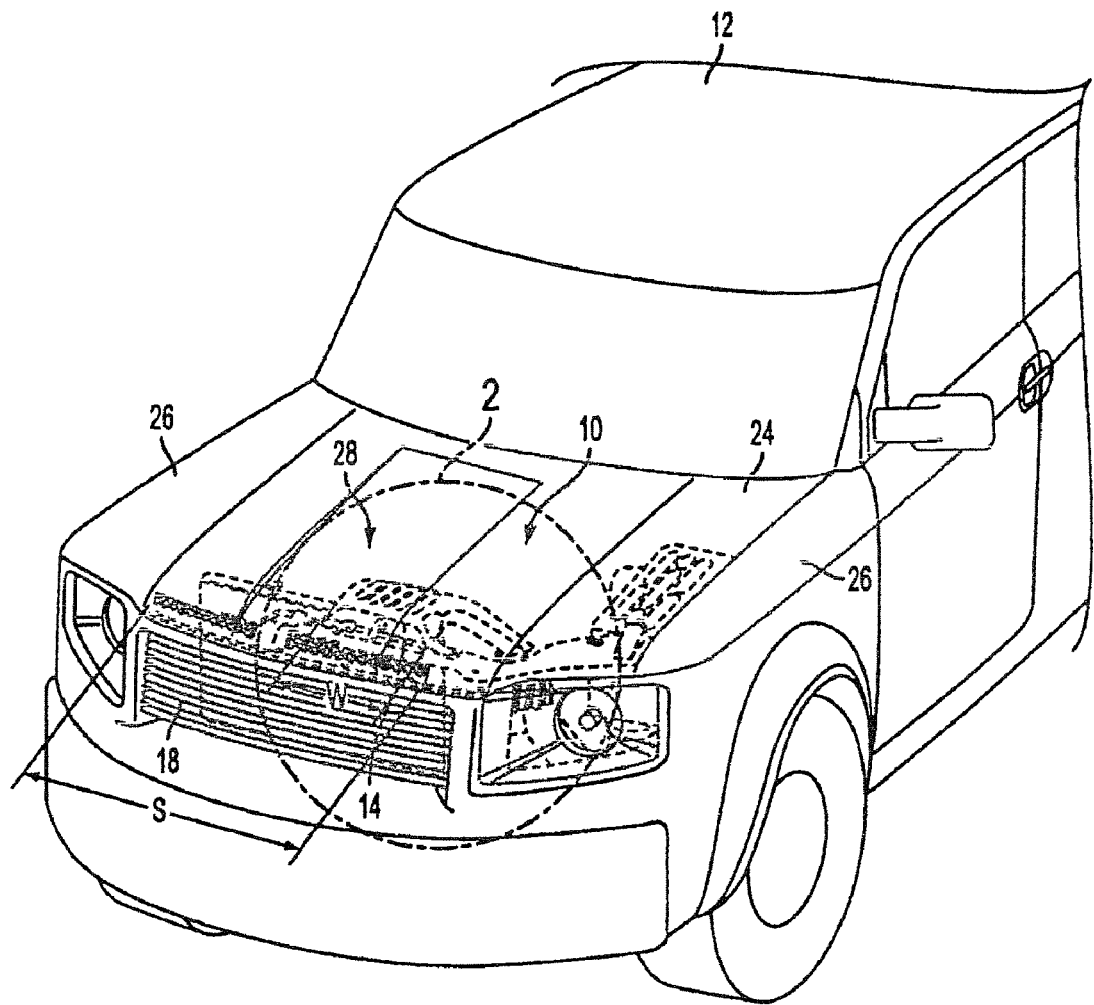
FIG. 1 is a front perspective view of an automobile or vehicle air intake system according to a first embodiment.

The various aspects of the invention may be embodied in various forms. The following description shows by way of illustration various embodiments in which aspects of the invention may be practiced. It is to be understood that other embodiments may be utilized and structural and functional modifications may be made without departing from the scope of the present invention. Referring now to FIGS. 1-8, an automobile air intake system 10 is shown according to a first embodiment as part of an automobile 12. As shown, automobile air intake system 10 generally includes an air intake enclosure 14 and a flow path 16 (see FIG. 8) to intake enclosure 14, which is generally formed by grille openings 19 through a grille 18, a radiator 20, and a front portion 22 of hood 24 disposed at the front portion of automobile 12. Automobile air intake system 10 provides cooler air from outside the engine compartment to the automobile engine (not shown) while deterring the ingress of particles and water contained in the air from being drawn into air intake enclosure 14.

Figure 2:
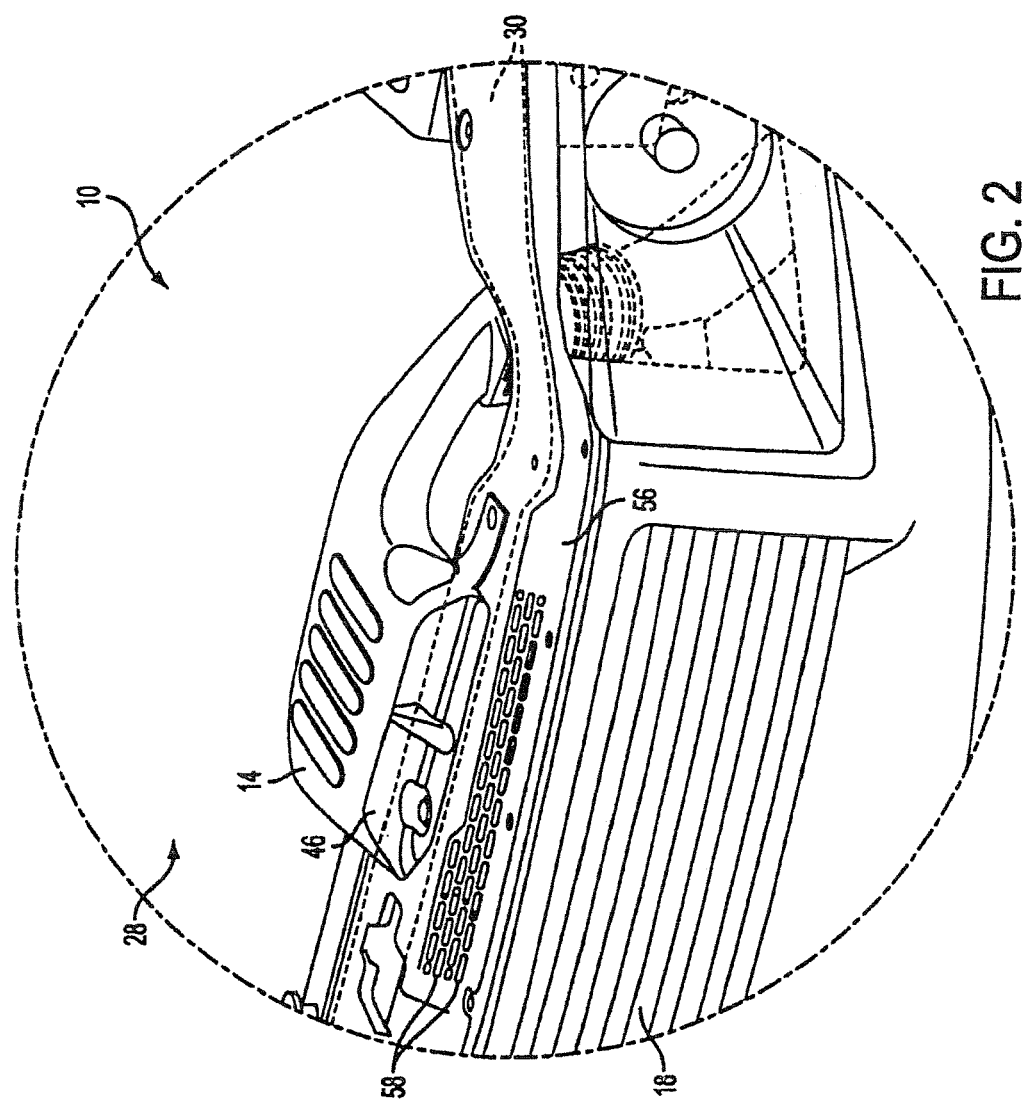
FIG. 2 is an enlarged front right perspective view of Detail 2 of FIG. 1.
Figure 3:
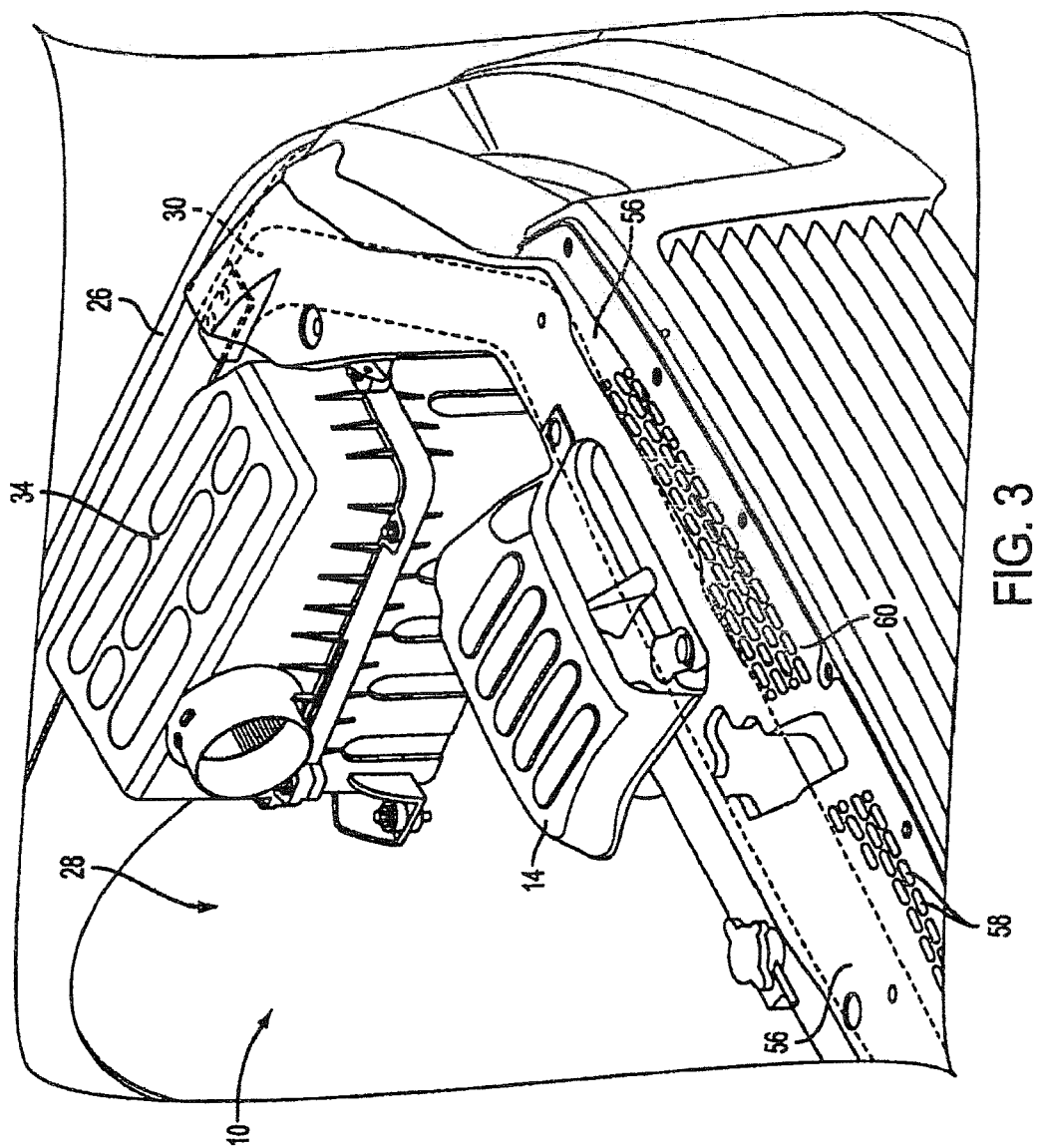
FIG. 3 is a front left perspective view of a portion of the automobile air intake system of FIG. 1 shown with the hood in an open position.
Figure 4:
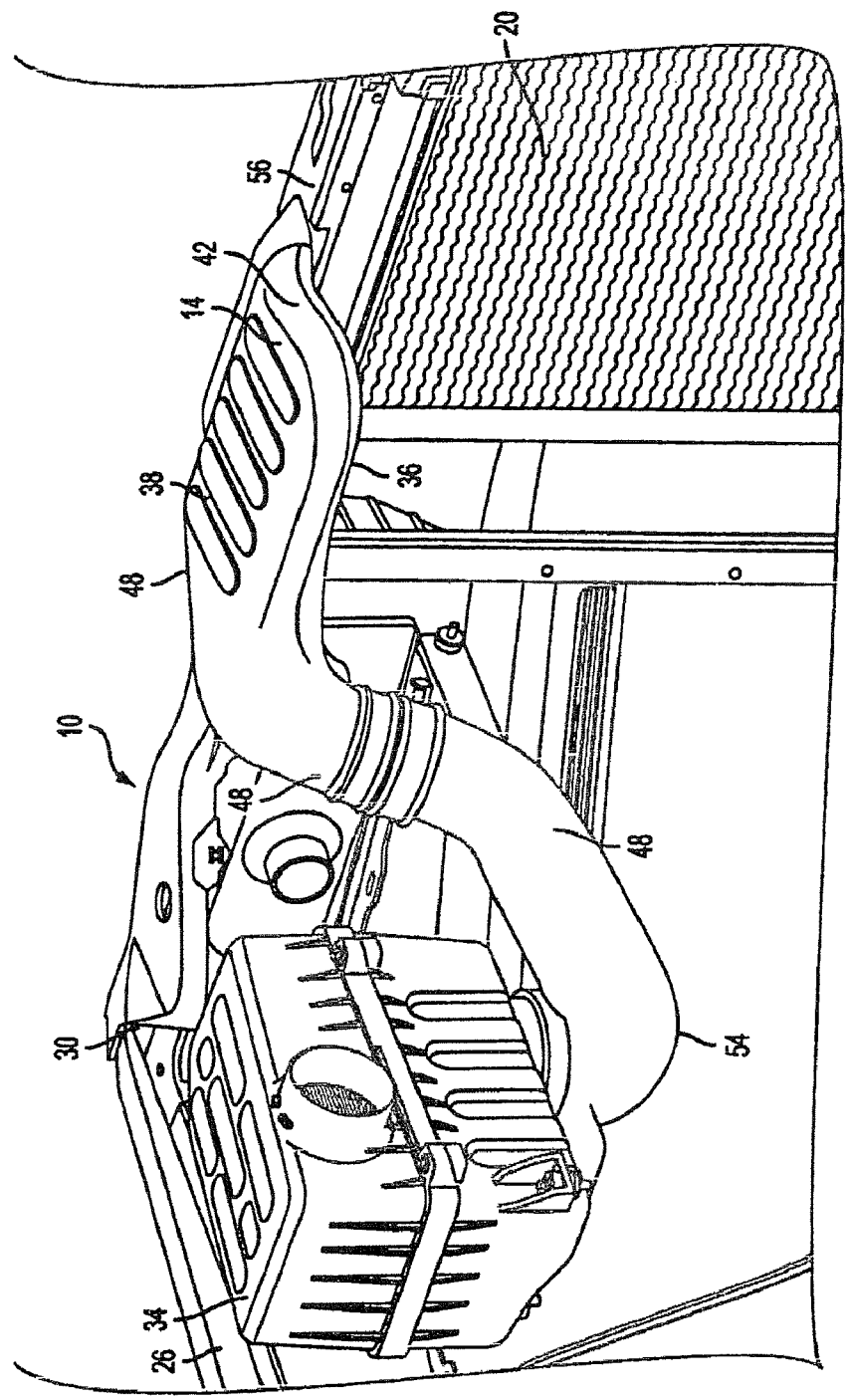
FIG. 4 is a rear perspective view of a portion of the automobile air intake system of FIG. 1 as viewed from within the engine compartment with the hood in an open position.

As shown in FIGS. 1-4, automobile 12 includes a frame 26 forming boundaries of an engine compartment 28. Disposed across the front of engine compartment 28 is a transverse frame element commonly referred to as the bulkhead 30. Bulkhead 30 is generally a structural frame member, such as a U-shaped steel bar, that traverses a front region of the engine compartment along a top region of the compartment. Air intake enclosure 14 is disposed above bulkhead 30 and can be attached directly to the bulkhead, to a bulkhead cover 56, and/or to other structures via hardware such as bolts and/or other common connectors. As shown in FIG. 4, air intake enclosure 14 provides an air passageway to air filter unit 34, which further channels filtered air to the automobile engine (not shown).

Figure 5:
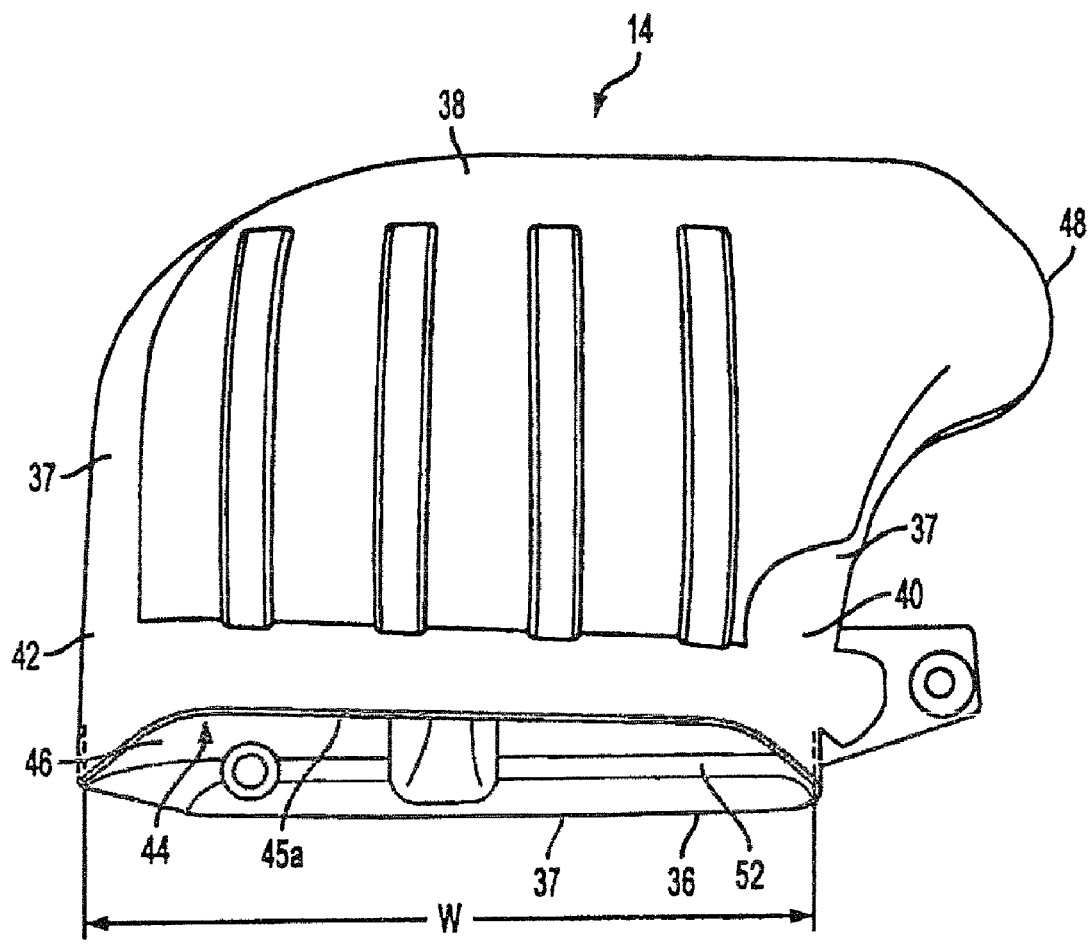
FIGS. 5 and 6 are top and side views respectively of the air intake enclosure of FIG. 1.
Figure 6:
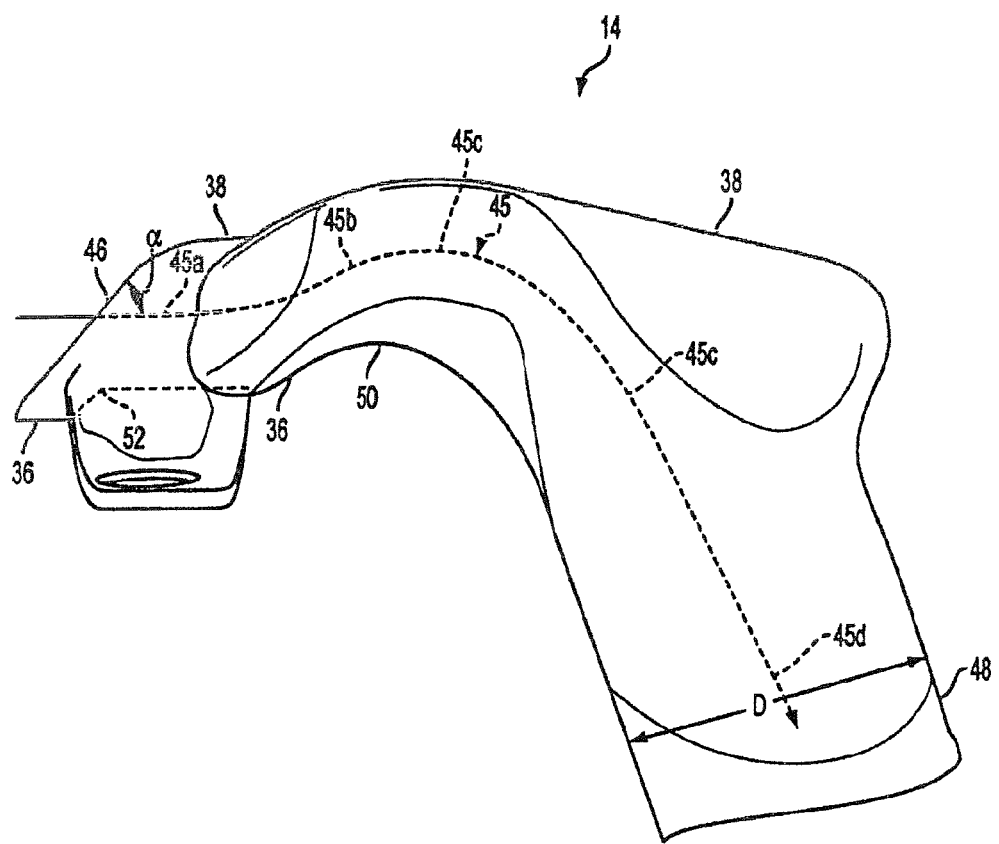
Figure 7:
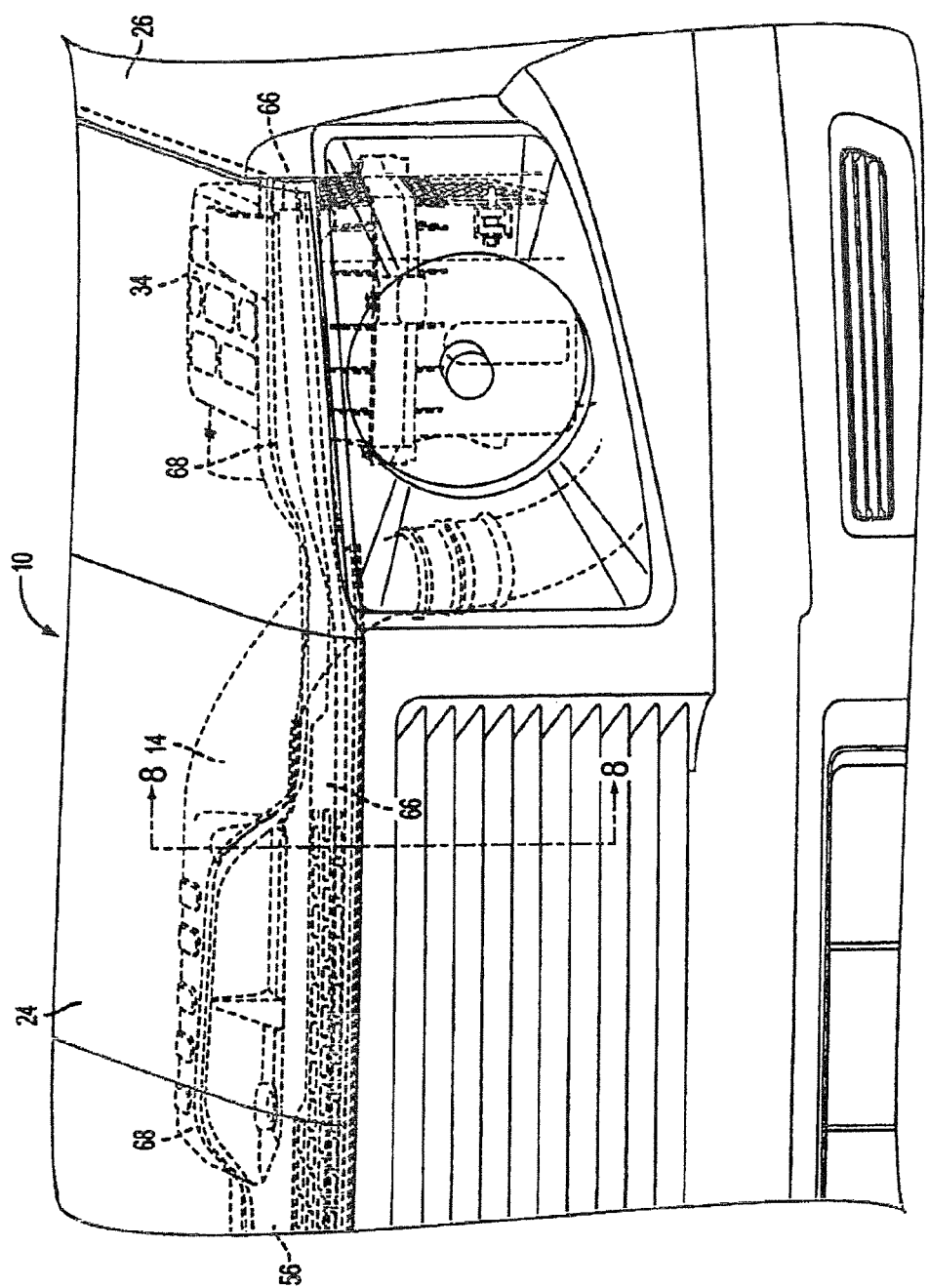
FIG. 7 is a front view of a portion of the automobile air intake system of FIG. 1 shown with the hood in a closed position.

Referring specifically to FIGS. 5 and 6, air intake enclosure 14 generally includes walls 37, which together form a channel 44 for channeling air along airflow path 45 to air filter unit 34. At a front portion of intake enclosure 14, walls 37 may include a base 36 opposed by a top 38, and a pair of opposing sidewalls 40 and 42. Front portions of base 36, top 38 and sidewalls 40 and 42 form an intake port 46 generally facing toward the front of automobile 12. Intake port 46 is preferably oblique from base 36 and/or from the cross-section of airflow path 45 to provide an opening that is larger than the cross-section of channel 44 perpendicular to airflow path 45 at intake port 46. For instance, as shown in FIG. 6, intake port 46 may form an acute angle $\alpha$ with airflow path 45 and/or base 36 at point 45a through intake port 46. Acute angle $\alpha$ is preferably between about 5 degrees and 85 degrees, and is more preferably between about 30 degrees and 60 degrees. Even more preferably, acute angle $\alpha$ is about 45 degrees, which provides an intake port 46 having a larger area than the cross-section of channel 44 perpendicular to airflow path 45. As discussed further below, this reduces the airflow velocity at intake port 46 to reduce the possibility of drawing in water and particles in the air. As shown, base 36, top 38 and sidewalls 40 and 42 curve together along airflow path 45 to form circular tube 48 extending toward air filter unit 34.

The cross-sectional area of channel 44 perpendicular to airflow path 45 preferably tapers down from a relatively large cross-sectional area at point 45a, as created by width W and the channel height at that point, to a smaller cross-sectional area based on the diameter D of tube 48 leading to air filter unit 34. Preferably, the cross-sectional area of channel 44 perpendicular to airflow path 45 at point 45a has an effective diameter that is 10 percent or more than the effective diameter of the cross-sectional area of the channel along tube 48 perpendicular to airflow path 45 at point 45d. This provides a lower air velocity at intake port 46 than along tube 48 for a given volumetric flow rate through channel 44. For example, the effective diameter at point 45a may be about 99 $cm^2$ and the effective diameter at point 45d may be about 88 $cm^2$. As discussed later in concert with FIG. 8, less particulate and/or water content is drawn into air intake enclosure 14 at lower air velocities through intake port 46, such as permitted via the relatively large cross-sectional area at point 45a, than would be drawn in with higher air velocities at the intake port, such as if the velocity at point 45d due to its smaller cross-sectional existed at point 45a. Air intake enclosure 14 is preferably a molded plastic unit as is known in the art, which is airtight, generally lightweight, and robust, yet inexpensive to manufacture; however, it can be formed via other known manufacturing technologies, such as from an assembly of metal or plastic components.

Figure 8:
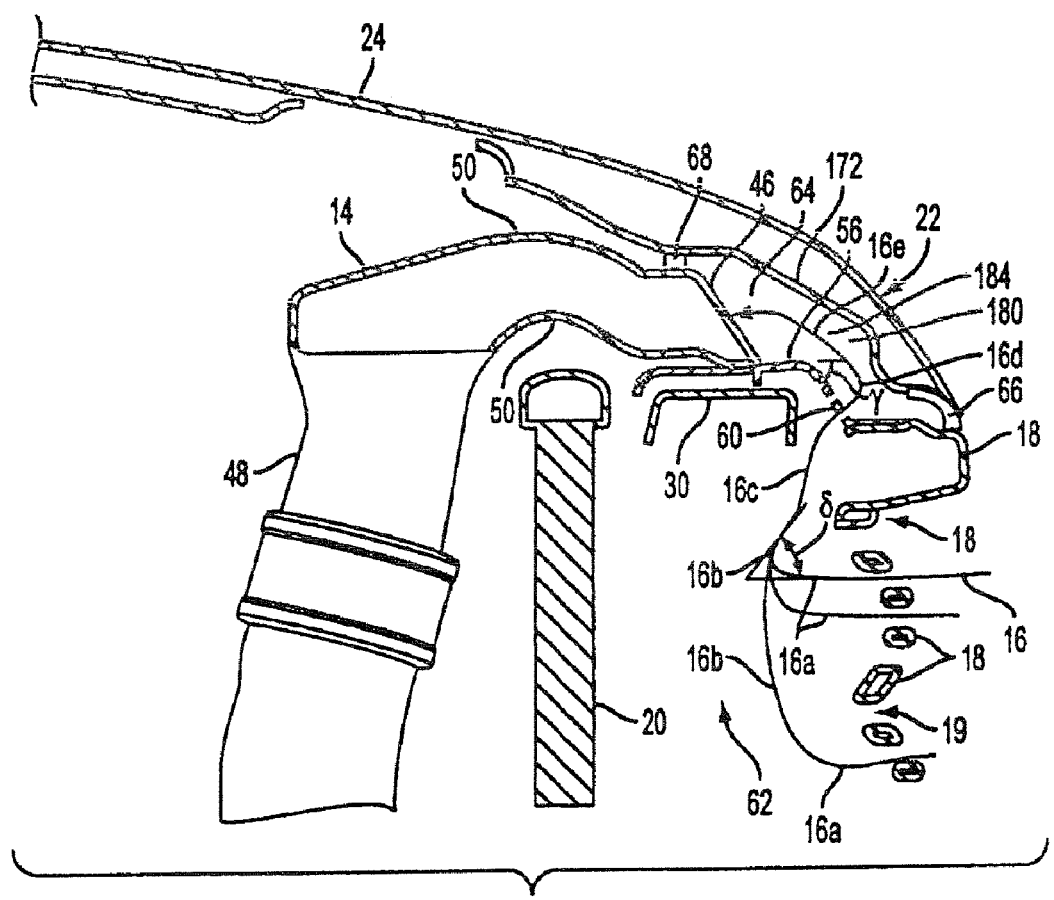
FIG. 8 is a partial cross-sectional view taken through line 8-8 of FIG. 7.
Figure 9:
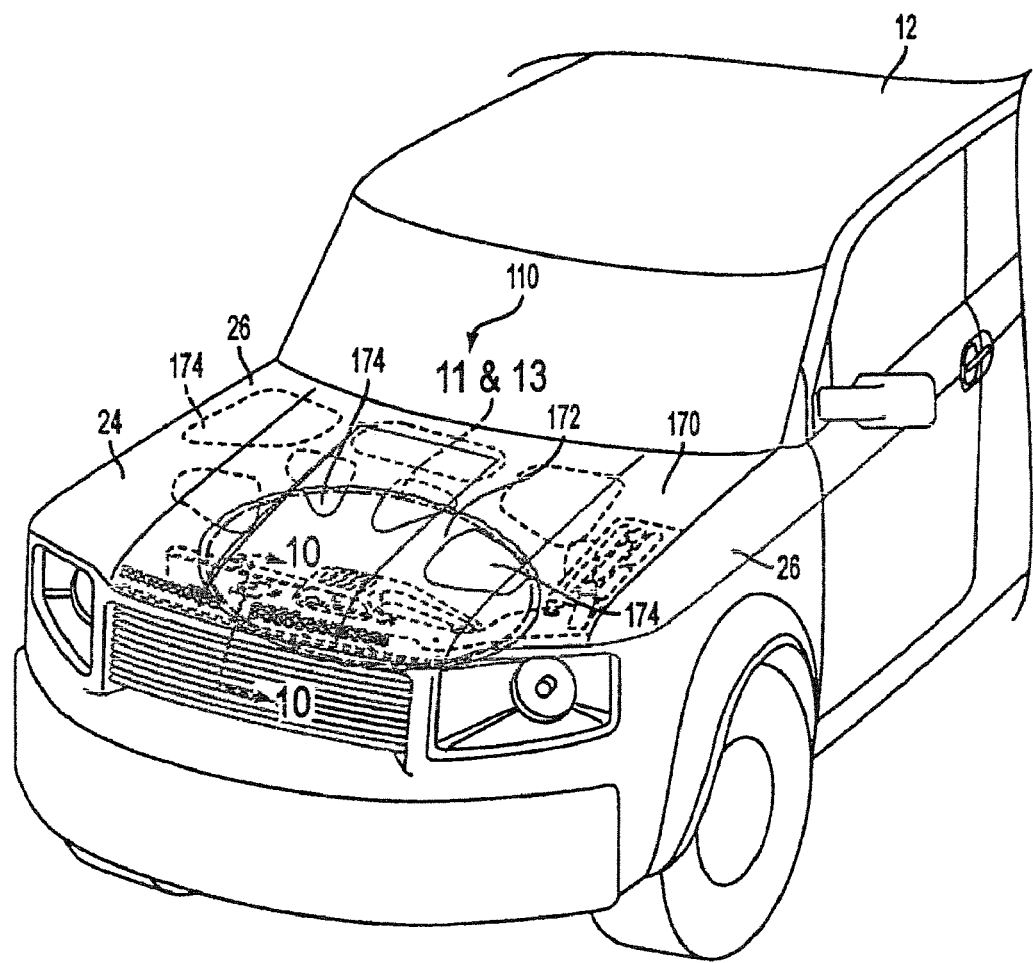
FIG. 9 is a front perspective view of an automobile or vehicle air intake system according to a second embodiment.

Air intake enclosure 14 is shaped and adapted to extend over radiator 20, which is preferably aligned underneath a high point or apex 50 of base 36 of air intake enclosure 14 (see FIG. 8). Thus, as shown in FIG. 6, base 36 and airflow path 45 at point 45b are inclined as they extend from intake port 46 to base apex 50. This encourages particles, objects, water, etc. to exit channel 44 via intake port 46, which may have been drawn into or fallen into channel 44. Stated another way, base apex 50 forms a gravity bias at the front of intake enclosure 14 to discharge particles, moisture, or objects out of the front of intake enclosure 14 through intake port 46. To further encourage such items to leave channel 44, base 36 forms a step 52 disposed within intake port 46. In the event objects such as tools fall through intake port 46 into channel 44 when the hood is in an open configuration, step 52 encourages these objects to exit channel 44 via intake port 46.

Placing radiator 20 below base apex 50 permits the radiator to be disposed behind bulkhead 20. As discussed later along with FIG. 8, radiator 20 is preferably disposed rearward of bulkhead 30, rather than aligned with or in front of bulkhead 30, which is most common in conventional vehicles. The rearward offset of radiator 20 from bulkhead 20 can reduce turbulence along flow path 16, reduce the absorption of heat from radiator 20 by intake air, and provide space for intake port 46 on top of bulkhead 30 by allowing bulkhead 30 to be lower than the top of radiator 20.

As shown in FIG. 6, base 36, channel 44 and airflow path 45 are preferably angled downward extending from base apex 50 toward air filter unit 34 along tube 48, as shown by points 45c and 45d. A bottom point 54 may exist along tube 48 prior to connecting with air filter unit 34 (see FIG. 4), which allows any objects or moisture drawn into channel 44 to collect for withdrawal in concert with air filter changes and/or to act as a fluid trap. Optionally, a drain hole (not shown) may be formed in tube 48 at bottom point 54 to permit the drainage of any moisture drawn into channel 44.

As shown in FIGS. 2, 3 and 8, a bulkhead cover 56 is disposed on top of bulkhead 30 and is preferably mounted substantially flat on top of bulkhead 30. Bulkhead cover 56 extends forward from the top of bulkhead 30 to the top of grille 18 and includes a plurality of holes 58 formed therethrough, which form a mesh or screen 60. Screen 60 forms an air permeable barrier across flow path 16 for inhibiting moisture droplets and relatively large particles from entering air intake enclosure 14 without significantly affecting the flow rate of the incoming air. Screen 60 should have holes that are small enough to screen out most debris, but not too small to significantly restrict airflow. For example, screen 60 may include holes having an area of about 140 square millimeters, which will prevent the ingress of most debris and permit good airflow therethrough. The moisture droplets and particles may be from water or particles splashed or thrown on the front of automobile 12, as well as from moisture or particles carried by intake air. Screen 60 provides an initial deflection of these items, which can prevent the intake system from being clogged or requiring premature replacement of the air filter (not shown).

Preferably, screen 60 extends between bulkhead 30 and grille 18 at an angle from horizontal to encourage any particles or moisture collected on screen 60 to travel downward and fall from screen 60. More preferably, as shown in FIG. 8, screen 60 is angled downward from bulkhead cover 56 to grille 18 at a downward angle γ from the top of bulkhead cover 56, which encourages particles or moisture collected on screen 60 to travel downward away from radiator 20 and avoid being drawn through the radiator. Downward angle γ is preferably between about 15 degrees and 85 degrees, and more preferably between about 30 degrees and 60 degrees. Even more preferably, angle γ is about 45 degrees. Downward angle γ in these ranges enables screen 60 to deflect items splashed or thrown toward the flow path 16 due to the small angle of incidence at which such items are likely to encounter screen 60 when angled downward at angle γ.

Referring specifically to FIG. 8, flow path 16 is illustrated with respect to various components of air intake system 10. As shown, radiator 20 is disposed rearward in the vehicle of bulkhead 30 beneath base apex 50. In conventional vehicles, the radiator 20 is superimposed beneath the bulkhead 30 relatively close to grille 18. Offsetting radiator 20 entirely rearward of bulkhead 30 provides a relatively large frontal space 62 compared with placing radiator 20 directly below bulkhead 30. Since radiator 20 is not superimposed beneath bulkhead 30, it provides flexibility in design to place bulkhead 30 lower in the engine compartment than conventional arrangements, such as generally even with or entirely below the top of radiator 20. (This also provides space for intake port 46 without significantly increasing the height of hood 24, if at all). Large frontal space 62 provides a pocket of air that is less turbulent than conventional arrangements, which reduces the mixing of intake air with warmer air proximate radiator 20. As such, cooler exterior air, which is denser and more efficient for combustion than warmer air, can be provided to air intake enclosure 14 and ultimately to the automobile engine (not shown). Frontal space 62 also provides a location for water disposed in the area of the intake path to drain down away from intake port 46.

As shown in FIG. 8, air is drawn into air intake enclosure 14 along flow path 16. The air flows in from the front of vehicle 12 through gaps 19 in grille 18. When vehicle 12 is being operated under average driving conditions, air is forced into frontal space 62 in a generally rearward direction along portion 16a of flow path 16 due to forward motion of vehicle 12. Radiator 20 and/or other components of vehicle 12 partially dam the air, which causes the air pressure to increase in frontal space 62. This encourages the air to turn about 90 degrees or more from its rearward path at portion 16b to flow upward along portion 16c. As such, air flowing through grille 18 turns such that it flows at an angle δ at portion 16b from its entry path to flow upward and forward along portion 16c through screen 60. Preferably, angle δ is about 15 degrees to 85 degrees, and more preferably is about 45 degrees. Channeling intake air to turn angle δ encourages moisture droplets and particles suspended in the air along portion 16a to continue rearward rather than being drawn along the relatively sharp turn of 16b along flow path 16.

The engine intake system provides vacuum via intake port 46 of air intake enclosure 14 to further encourage air from frontal space 62 to turn along portion 16b and flow upward along portion 16c. Vacuum from the intake system may be the primary moving force to encourage air to move along flow path 16 when the vehicle is not moving or is moving rearward. Once intake air is drawn in through screen 60 along portion 16c, the inside of hood frame 172 at a forward portion of hood 24 channels the air to turn it rearward at portion 16d and to channel it toward intake port 46 along portion 16e. The rearward turn at portion 16d further encourages remaining moisture droplets or particles to drop out of the air, such as by collecting on the inside of hood frame 172. Thus, flow path 16 may be a serpentine path that is generally S-shaped in the vertical plane, which encourages suspended particles and moisture droplets drawn through grille 18 to continue rearward toward the radiator based on their greater mass and momentum in comparison with the air. Flow path 16 further encourages remaining particles and moisture droplets to collect along screen 60 or the inside of hood frame 172. Thus, the amount of moisture and particulate drawn into the air intake system is reduced compared with non-winding intake paths.

This arrangement provides advantages over simpler winding intake paths, as the large rearward momentum of the particles and moisture droplets entering grille 18 at normal vehicle driving speeds encourages their separation from the air. To reduce particulate and moisture content further, screen 60 is disposed to capture particles and liquid droplets that may continue along portion 16c of flow path 16 or that may splash upward along the air path. The serpentine flow path 16, which is generally S-shaped as viewed in the vertical plane, can eliminate a large amount of moisture droplets and particles from intake air, which is enhanced by screen 60.

In addition to the vertical channeling of intake air as illustrated by the general S-shape shown in FIG. 8, flow path 16 also channels a large portion of intake air horizontally to further reduce the amount of particulate and moisture droplets further. As shown in FIG. 1, screen 60 generally extends across grille 18 a distance S that is much wider than the width W of intake port 46. Thus, as shown in cross-section in FIG. 8, a generally horizontal bulkhead channel 64 is formed between the top of grill 18, bulkhead cover 56, screen 60, and the inside of hood frame 172. After intake air is drawn through screen 60, depending on its lateral relation to intake port 46, it may be channeled laterally along bulkhead channel 64. Within bulkhead channel 64, the intake air is channeled laterally to turn an angle of about ninety degrees for channeling it toward air intake port 46.

Seals 66 and 68 are preferably disposed fore and aft of bulkhead channel 64, which may be attached to the underside of hood frame 172, to provide a generally airtight flow path 16 extending laterally toward intake port 46. Seals 66 and 68 are preferably made from compressible materials, such as rubber or foam, which can provide tight seals between the inside of hood frame 172 and grille 18, the top of intake air enclosure 14, and bulkhead cover 56. Tight seals enhance the effectiveness of air intake system 10 by ensuring the majority of intake air travels via airflow path 16 into intake port 46. Other seals, such as tongue-and-groove configurations between the inside 172 of hood 24 and bulkhead cover 56 or other structures, are also contemplated for generally sealing bulkhead channel 64. Vacuum from the engine provides low air pressure inside air intake enclosure 14, which encourages intake air to travel along bulkhead channel 64 into intake port 46. Higher pressure within intake space 62 during forward movement of vehicle 12 further encourages intake air to travel along bulkhead channel 64 into intake port 46 due to the width of grille 18 and screen 60 compared with intake port 46. Thus, although a portion of intake air may travel generally vertically up through screen 60 directly into intake port 46, a significant portion of intake air may travel laterally within bulkhead channel 64 along bulkhead cover 56 from portions of screen 60 that are not disposed directly in front of intake port 46. Such lateral channeling of much of the intake air further encourages moisture droplets and particles to drop out of the intake air.

Various aspects of air intake system 10 combine together to reduce the quantity of moisture droplets and particulate in intake air. Reducing the amount of moisture droplets and particles in intake air increases the life of the air filter disposed in air filter unit 34, provides cleaner air to the intake system and engine, and provides cooler outside air for combustion, which can greatly increase the efficiency of the engine (not shown). Turns 16b and 16d of the vertical portion of flow path 16, combined with the lateral channeling of air through bulkhead channel 64 portion of flow path 16 and the low air velocity along flow path 16, encourages many particles and moisture droplets to exit the intake air prior to entry through intake port 46. Due to greater length of bulkhead channel 64 compared with the width of intake port 46, the velocity of air being drawn through screen 60 can be lower than the velocity of air entering through intake port 46. As discussed above along with FIGS. 5 and 6, the intake velocity at intake port 46 is kept relatively low compared with the velocity along tube 48, which even further reduces the ingress of moisture and particles. These aspects combine together to greatly reduce the ingress of moisture and particles into air intake system 10.

In addition to providing cooler and cleaner air during normal driving condition provided by the aforementioned aspects of intake air system 10, which can be practiced individually or together, air intake system 10 further reduces the possibility of drawing moisture and particles into the intake system during more extreme driving conditions. The placement of intake port 46 as high as possible against the inside of hood 24 reduces the likelihood of water entering the intake system during extreme driving conditions, such as through heavy rain storms or high-standing water. As long as air can enter flow path 16, such as via the top portion of grille 18, cooler exterior intake air can be provided to the intake system that has reduced moisture and particulate content. Even during these extremely wet conditions, the vertical and lateral channeling of air along airflow path 16, the low intake air flow rate through airflow path 16, and the screening of the air through screen 60 reduce the likelihood of water droplets being drawn into air intake system 10.

Referring now to FIGS. 9-12 along with FIGS. 1-8, an automobile air intake system 110 according to a second embodiment is shown. Intake system 110 provides an alternate intake path for conducting air contained within engine compartment 28 to intake port 46 in the event a primary intake path to exterior air is unavailable or partially blocked. Automobile air intake system 110 generally includes the aspects and preferences of air intake system 10 discussed above, except regarding the alternate intake path. Although air intake system 110 generally includes the aspects and preferences of intake system 10, aspects of air intake system 110 related to an alternate intake path may be practiced apart from the aspects and preferences of air intake system 10. Further, the alternate intake path aspects of system 110 may be practiced as a primary or sole intake path for providing air from an engine compartment to an engine.

Figure 10:
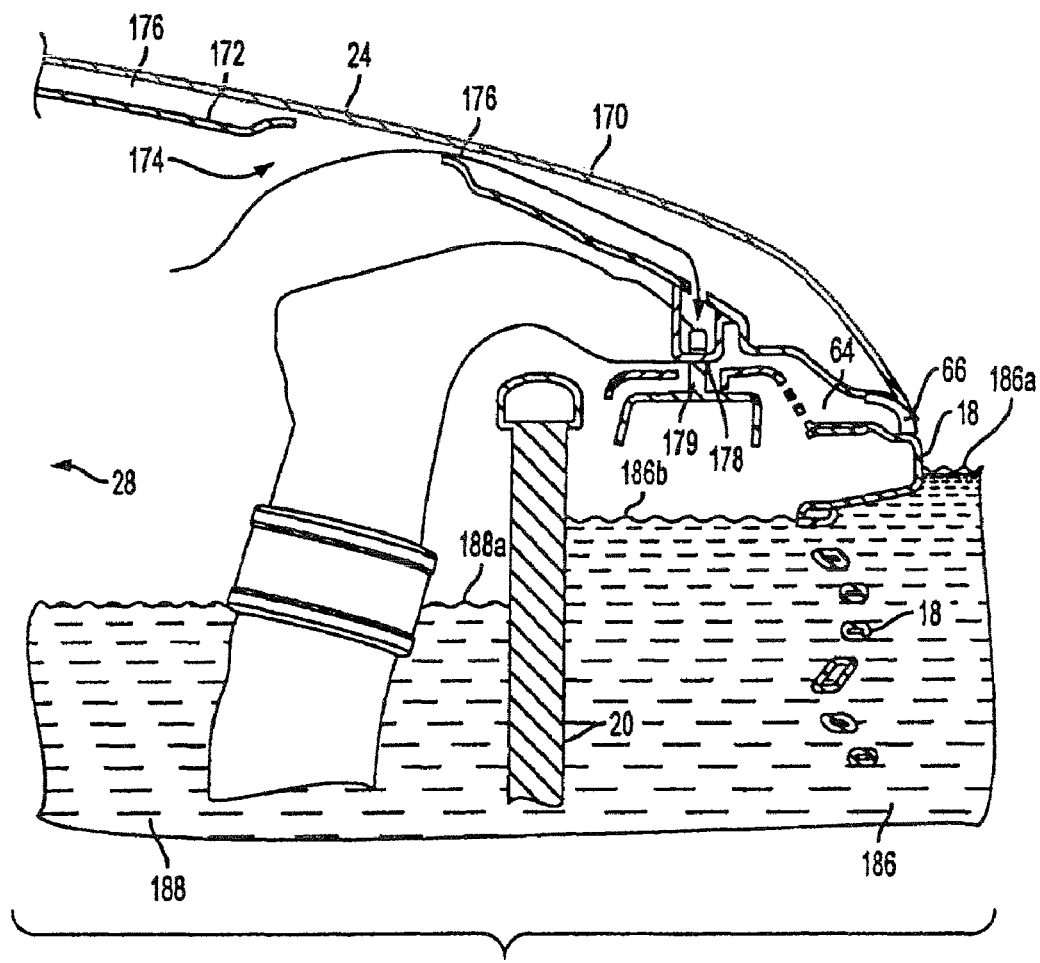
FIG. 10 is a partial cross-sectional view taken through line 10-10 of FIG. 9.

In addition to the features disclosed along with embodiment 10, automobile intake system 110 generally includes an air intake path within hood 24 that extends between engine compartment 28 and bulkhead channel 64. As shown in FIG. 10, hood 24 includes an outer skin 170 that is generally uninterrupted, and a hood frame 172 spaced apart from and attached to the underside of hood skin 170. Hood frame 172 forms a plurality of intake orifices 174 generally disposed in the central region of the hood 24 for drawing in air from within engine compartment 28. Gaps between hood skin 170 and hood frame 172 form one or more air passageways 176 for conducting air from within engine compartment 28 via intake orifices 174 to an exit port 178, which feeds into bulkhead channel 64. As shown, exit port 178 may be a latch hole through hood frame 172 used to engage a latch 179 when hood 24 is in the closed position. Passageways 176 provide an alternate intake path from inside the engine compartment to bulkhead channel 64, which leads to intake port 46. Thus, in the event the primary airflow path 16 providing exterior air to intake port 46 is partially or fully blocked, air within engine compartment 28 may be channeled into the engine (not shown) to keep it running. This can be a great advantage for unexpected emergency conditions, such driving into deep flood waters.

Figure 11:
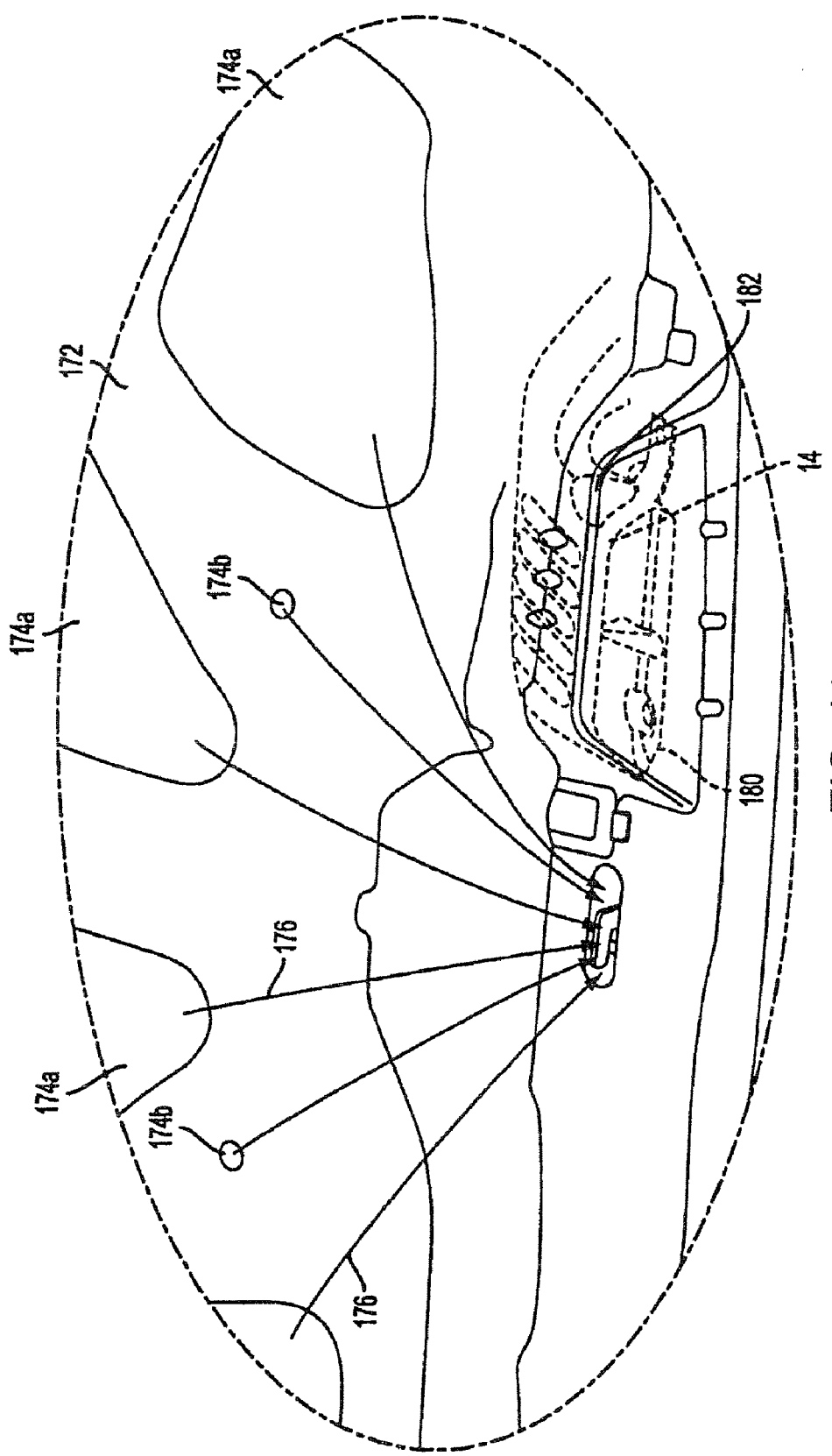
FIG. 11 is a perspective view of Detail 11 of FIG. 9 showing the hood frame with the hood skin removed.

FIG. 11 is a top perspective view of hood frame 172 with hood skin 170 removed to show the passageways 176 within hood 24 for conducting air from engine compartment 28 via intake orifices 174 to exit port 178. Intake orifices 174 include large orifices 174a, which can serve the dual purpose of reducing the weight of hood 24 by eliminating elements of hood frame 172 and providing large airflow into air passageways 176, and small orifices 174b. The small orifices can be strategically formed within hood frame 172 to provide air intake advantages. For instance, small orifices 174b may be placed nearer to exit port 178 than larger orifices 174a to improve flow through hood passageways 176 without significantly affecting the strength of hood frame 172. In comparison with smaller orifices 174*b*, the placement of large orifices 174*a* may be more significantly governed by hood frame strength considerations. In another example, small orifices 174*b* may be placed in desirable intake positions within engine compartment 28, such as at high points in hood 24 or in positions away from concentrations of engine heat.

Figure 12:
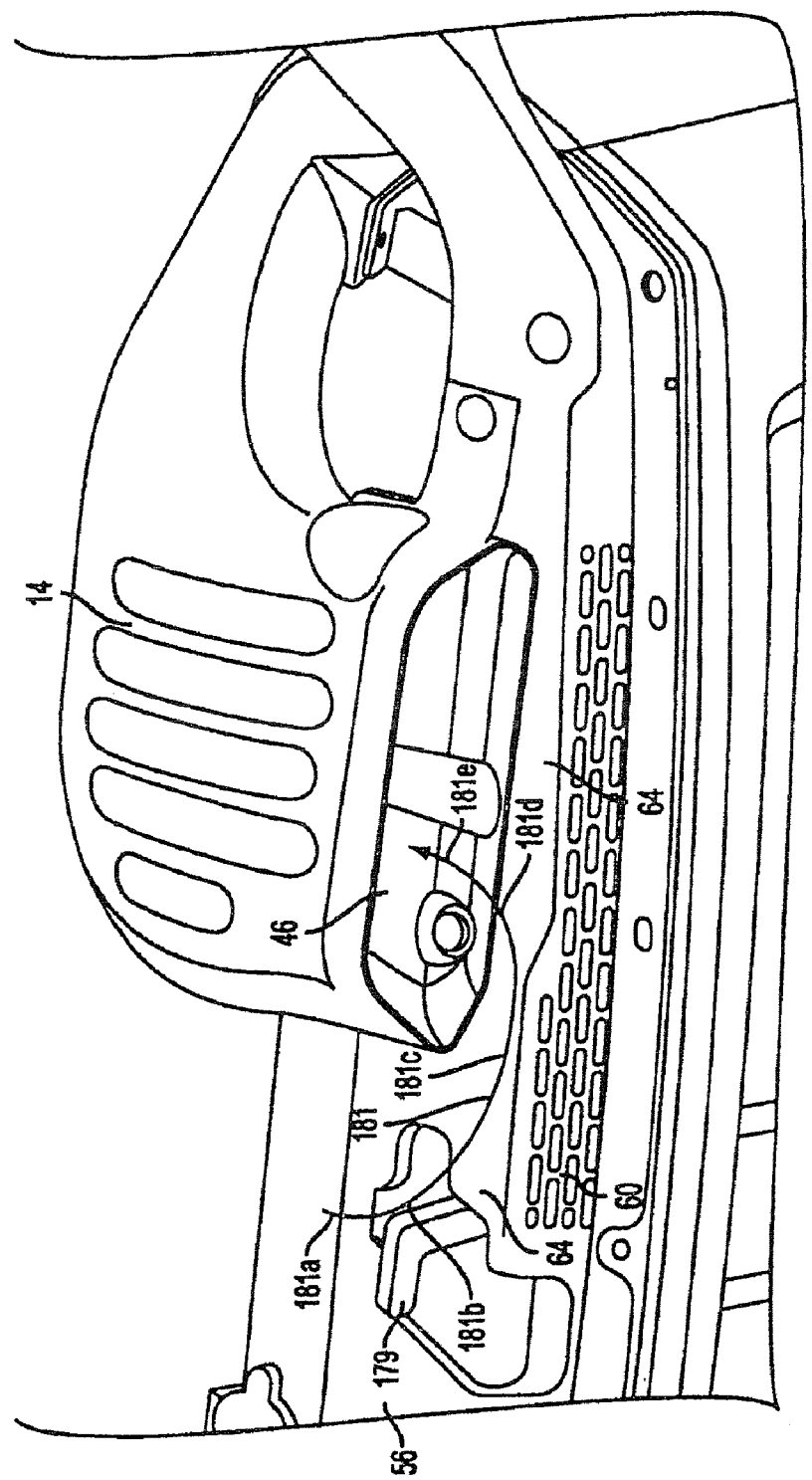
FIG. 12 is a perspective view of a portion of the automobile air intake system of FIG. 9 showing the air flow into the air intake enclosure.

Hood frame 172 shown in FIG. 11 includes a bulge 182 that, on its opposite side, forms an intake enclosure cavity 180 on the underside of the hood frame 172. As shown in FIG. 8, cavity 180 receives a top portion of intake enclosure 14 and provides a space 184 in front of intake port 46, which permits intake air entering intake port 46 to have a relatively slow velocity compared with the velocity along tube 48 of intake enclosure 14. As shown in FIG. 12, air exiting exit port 178 enters bulkhead channel 64 and is channeled into intake port 46 via cavity 180.

Passageways 176 shown in FIG. 11 are preferably used to provide air to the automobile engine on condition the primary path, such as flow path 16, is at least partially blocked. For example, suppose a vehicle suddenly encounters floodwaters 186 with a water level at a depth 186*a* up to the height of grille 18 or greater as shown in FIG. 10. The water blocks airflow at portion 16*a* of flow path 16 from providing air to bulkhead channel 64 and thereby to intake port 46. As such, the automobile engine (not shown) on an automobile without intake system 110 may stall and/or draw in water, and the vehicle driver may become stranded. With an intake system such as automobile intake system 110, intake port 46 may draw air from inside engine compartment 28 via passageways 176, exit port 178 and bulkhead channel 64 to thereby permit continued operation of the engine (not shown).

Because intake orifices 174 are disposed at the top of engine compartment 28 within hood 24, the air drawn in is not proximate to the water 188 disposed within engine compartment 28. Further, because radiator 20, grille 18, and other front portions of the automobile act as dam while the automobile moves forward, the level 188*a* of water within the engine compartment should be lower than the level of water 186*b* in front of radiator 20 or the level of water 186*a* in front of the vehicle. Thus, the automobile engine (not shown) can continue to operate through the high water levels by drawing air through air passageways 176, exit port 178 and bulkhead channel 64 into intake port 46.

In addition to providing an alternate path for intake air, automobile intake system 110 provides winding passageways to inhibit the intake of moisture droplets and particles into intake enclosure 14. The large sizes of the intake orifices 174 in hood frame 172 and the passageways 176 within the hood allow the air to be withdrawn from the engine compartment at a relatively slow velocity compared with the velocity through intake enclosure 14. The inside of hood 24 along passageways 176 may act like baffles to condense and capture moisture contained within the intake air. Further, the flow channel through exit orifice 178 and bulkhead channel 64 encourages moisture and particles to be removed from the intake air in a manner similar to flow path 16 by turning the air as it leaves exit orifice 178 and enters bulkhead channel 64.

During normal operation of automobile 12 in which flow path 16 is not obscured, little if any air will be drawn through passageways 172 from engine compartment 24. This is because high pressure in frontal space 62 during forward vehicle motion drives air into bulkhead channel, which will not favor and may likely discourage airflow into bulkhead channel 64 from exit orifice 178. When vehicle 12 is not moving, the path of least resistance will likely be through airflow path 16 rather than via exit orifice 178, because the cross-sectional flow area through exit orifice 178 is small compared with airflow path 16. As such, passageways 176 require a larger pressure differential to draw air therethrough than airflow path 16. During normal operating conditions, air is readily available via the comparably large intake area of flow path 16. However, when flow path 16 becomes partially or fully blocked, the vacuum draw from the engine (not shown) via intake enclosure 14 increases at exit orifice 178 due to restricted air intake, which increases the pressure differential between engine compartment 28 and bulkhead channel 64 to thereby draw air through air passageways 172 and exit orifice 174.

Figure 13:
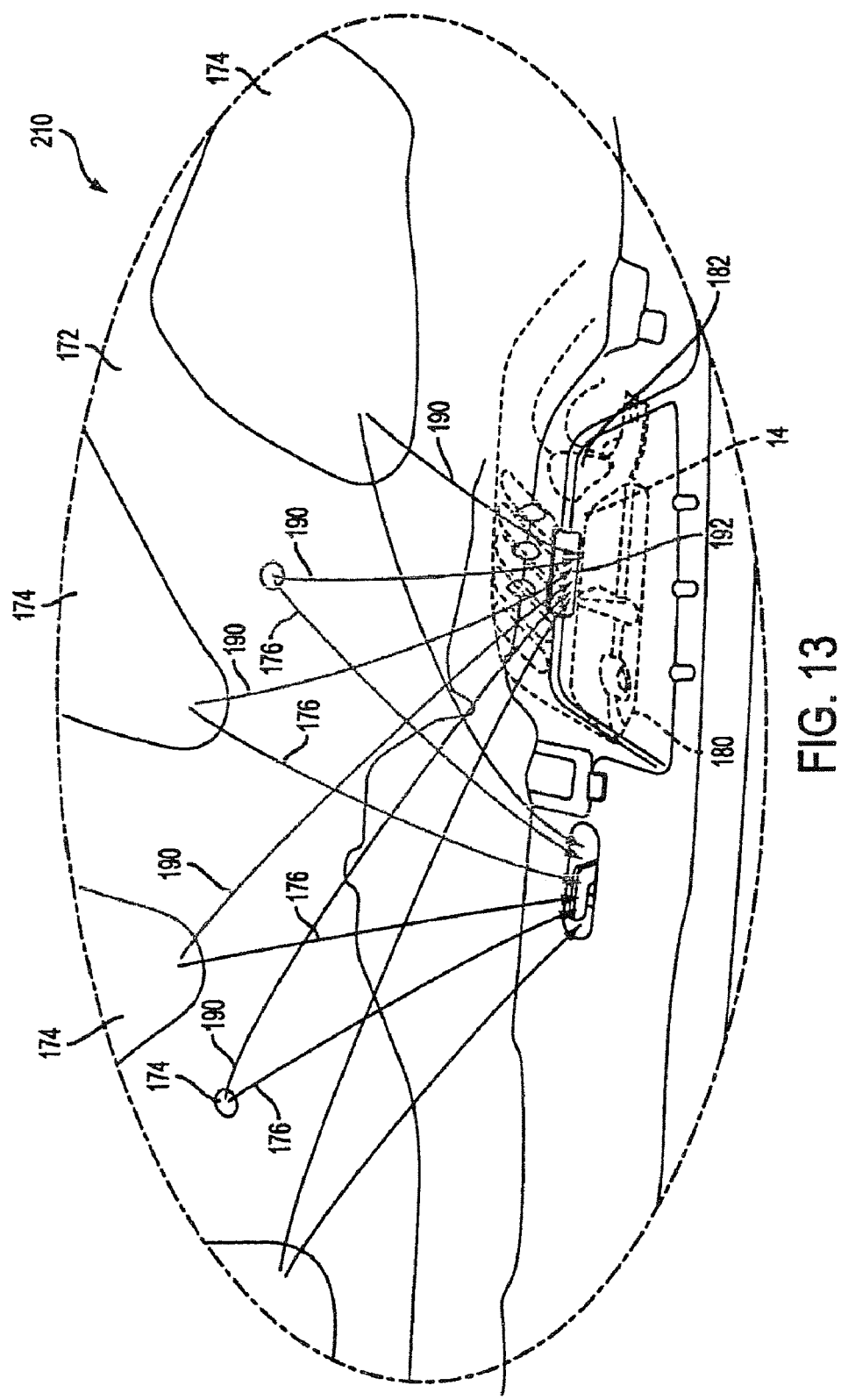
FIG. 13 is perspective view of a portion of an automobile air intake system similar to FIG. 11 according to a third embodiment showing the hood frame with the hood skin removed.
Figure 14:
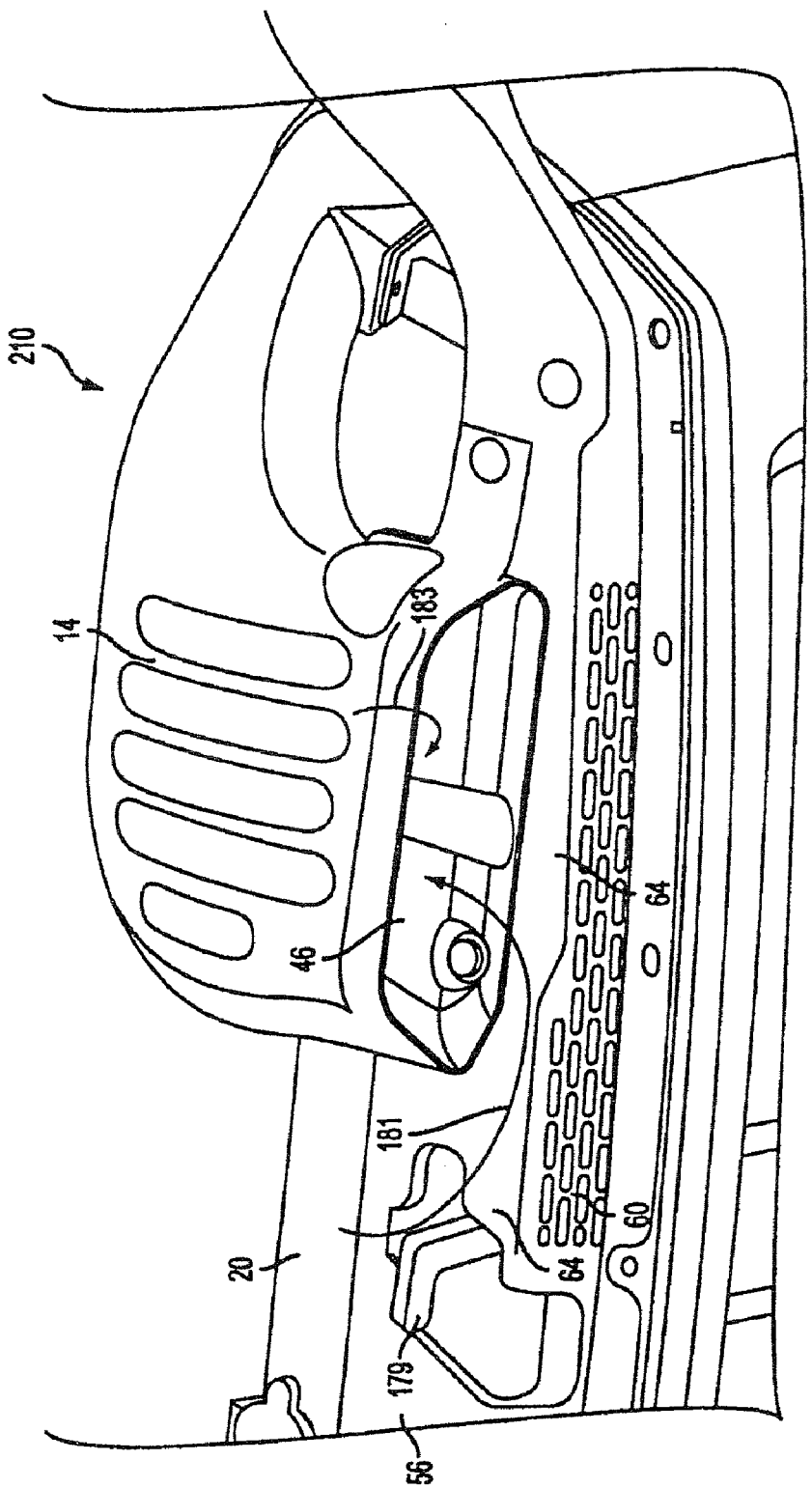
FIG. 14 is a perspective view of a portion of the automobile air intake system of FIG. 13 showing the airflow into the air intake enclosure.

Referring now to FIGS. 13 and 14, an automotive intake system 210 according to a third embodiment is shown. Automotive intake system generally includes the aspects and preferences of automotive intake system 110, except as relating a second exit orifice within hood skin 172. As shown in FIG. 13, hood frame 172 forms a second exit orifice 192 through bulge 180 and intake enclosure cavity 180 that extends into space 184 in front of intake port 46. This additional port provides increased airflow to intake enclosure 14 from engine compartment 24 on condition flow path 16 becomes partially or fully blocked. Passageways 190 conduct air from the engine compartment 24 to second exit orifice 192 in concert with passageways 176 for conducting air to exit orifice 178. Intake air exits second exit orifice 192 via path 183 shown in FIG. 14 to enter intake port 46. Optionally, one or more valves (not shown), such as spring biased valves, may be provided at exit orifices 178 and 192 to prevent inflow from the alternative passageways during normal operating conditions. When the vacuum draw within bulkhead channel 64 increases due to limited air supply, the optional valves (not shown) may open to provide access to the alternative passageways 172 and 190.

Automobile air intake systems 10, 110 and 210 illustrate various aspects of an automotive air intake system according to exemplary embodiments. These systems provide cool exterior air to the engine during normal driving conditions, which may have fewer particles and lower moisture content. In addition, aspects of these systems can reduce the possibility of drawing moisture and particles into the intake system during more extreme driving conditions, such as heavy rain or high water conditions. The aspects disclosed in these embodiments can be practiced individually or together. For instance, aspects related to airflow path 16 may be practiced without practicing aspects related to the configuration of air intake enclosure 14. In another example, the alternate intake path aspects of system 110 may be practiced as a primary or sole intake path for providing air from an engine compartment to an engine.

Figure 15:
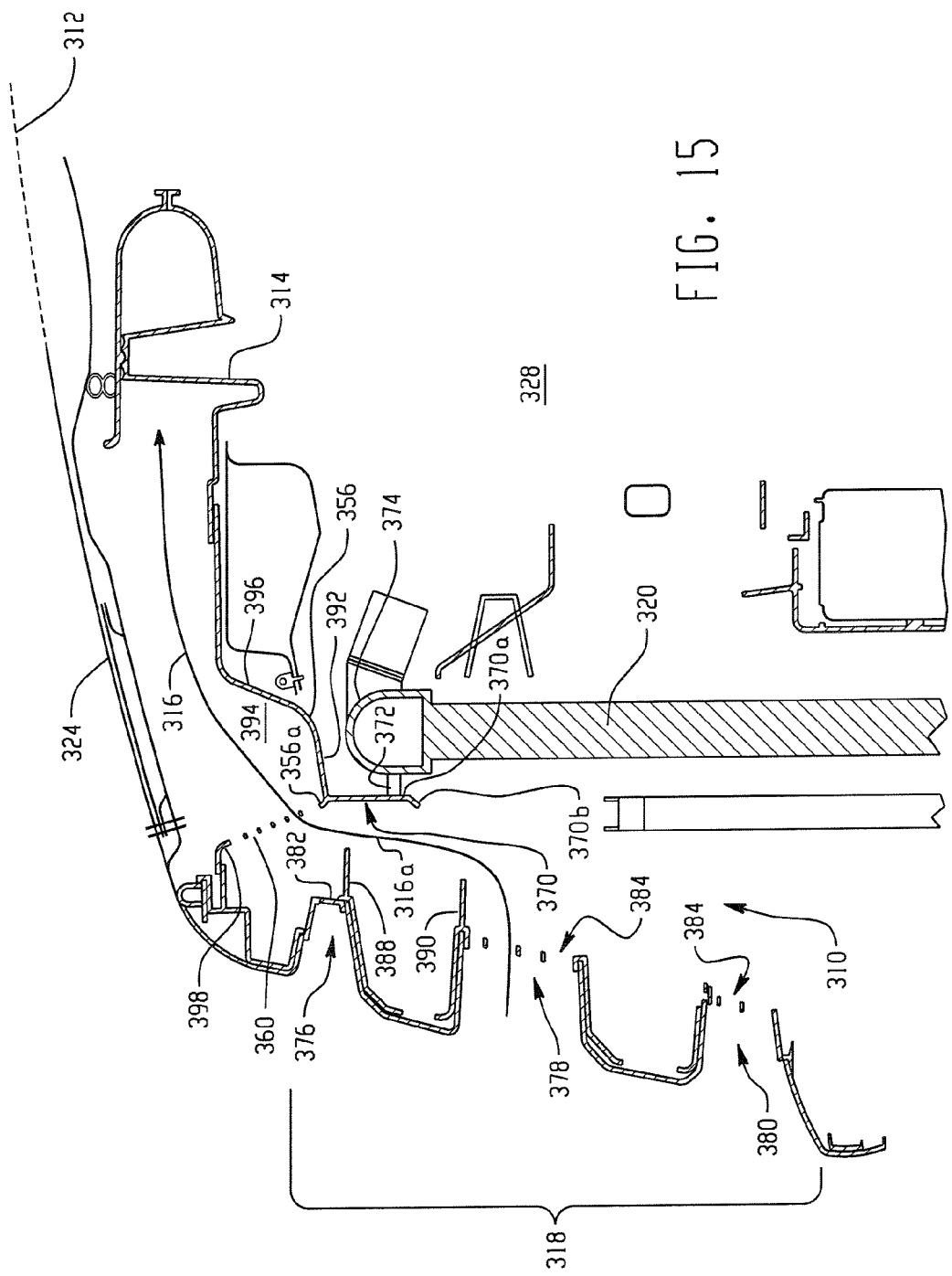
FIG. 15 is a schematic cross sectional view of an automobile or vehicle air intake system according to a fourth embodiment.
Figure 16:
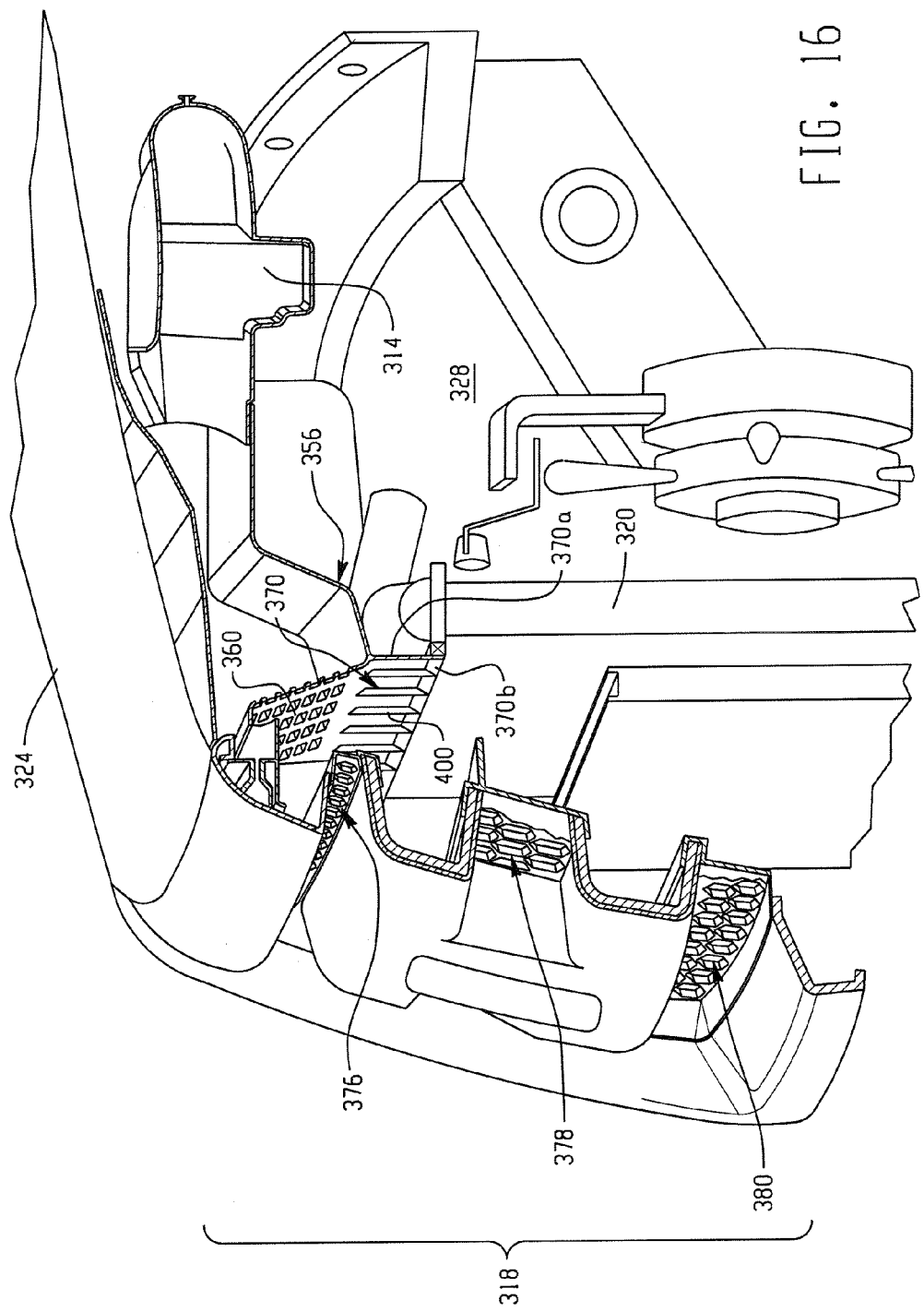
FIG. 16 is an oblique cross sectional view of a portion of the automobile air intake system of FIG. 15.

Referring now to FIGS. 15-16, a vehicle air intake system 310 according to a fourth embodiment is shown. The vehicle air intake system 310 can include aspects of the air intake system 10 discussed hereinabove unless otherwise indicated herein. In the schematically illustrated embodiment of FIG. 15, the air intake system 310 includes a grill 318 disposed along the front portion of an engine compartment 328, a hood 324 disposed over the engine compartment 328, and a bulkhead cover 356 disposed in the engine compartment 328 below the hood 324. The bulkhead cover 356 has a bulkhead cover intake port 360 and a deflector 370 disposed along and extending forwardly from a lower portion 356*a* of the intake port 360 to circuitously redirect air flow passing from the grill 318 to the intake port 360. The grill 318 and the deflector 370 define an airflow path 316 that extends from the grill 318 to the intake port 360 for delivering airflow received through the apertures 384 of the grill 318 to the intake port 360. The deflector 370, which is also referred to herein as an extension, protrudes from the lower portion or wall 392 of the bulkhead cover 356 to circuitously form the airflow passage 314 for inhibiting liquid and debris from reaching the intake port 360. As will be described in more detail below, one or both the grill 318 and a deflector 370 can be configured to define the airflow path 316 as a serpentine airflow path from the grill 318 to the intake port 360.

The vehicle air intake system 310 can further include a screen through which airflow from the grill 318 passes for inhibiting moisture droplets and/or other particles (e.g., snow) from entering into a downstream intake enclosure 314. In the illustrated embodiment, the screen is disposed over or across the intake port 360 and is formed integrally with the bulkhead cover 356. The screen can be structurally configured to function the same or similar to the screen 60 of the first embodiment shown in FIGS. 1-8, though this is not required.

The intake system 310 can further include a radiator 320 disposed within the engine compartment 328 below the bulkhead cover 356 and its intake port 360. The radiator 320 can further form the airflow path 316, or at least a portion thereof, as a serpentine airflow path. The radiator 320 at least partially dams airflow entering the apertures 384 of the grill 318 and redirects the airflow 90° or more (e.g., straight upward toward the intake port 360). In the illustrated embodiment, the intake port 360 is disposed forwardly of the radiator 320. As shown in the illustrated embodiment, a distal end portion 370a of the deflector 370 can be secured to the radiator 320. In particular, a seal 372 can be disposed between the distal end portion 370a and a cap 374 on the top of the radiator 320. This arrangement directs airflow entering the grill 318 upward around the deflector 370 and into the intake port 360 of the bulkhead cover 356.

The grill 318 of the illustrated embodiment includes an upper intake portion 376, a central intake portion 378 and a lower intake portion 380. In the shown embodiment, the upper intake portion 376 is blocked by closure member 382 to prevent airflow from entering the grill 318 through the upper intake portion 376 as this would result in a straight-line airflow path from the grill 318 to the intake port 360. Instead, airflow enters the grill 318 through one or more inlet apertures 384 defined at one or both of the grill intake portions 378,380. The inlet apertures 384 of the grill intake portions 378 and 380 are disposed below and spaced apart vertically from the deflector 370 and the intake port 360. This configuration further defines the portion 316a of the airflow path 316 extending from the grill 318 to the intake port 360 as a circuitous or serpentine airflow path. In addition, extensions or protrusions 388 and 390 can extend from the grill 318 inward into the engine compartment 328 to further constrict and circuitously redirect the airflow path 316, and particularly the portion 316a thereof.

The bulkhead cover 356 of the embodiment illustrated in FIGS. 15 and 16 includes a plurality of walls and a base or base wall 392 that form a front trench portion 394, also referred to herein as a deep intake channel. The walls include a rearward wall 396 extending upward from the base wall 392 and a forward wall 398 spaced apart from the rearward wall 396 and extending upward from the base wall 392. As shown, the forward wall 398 has the intake port 360 defined therein. End portions of these walls and the base 392 form the intake port 360 as an entryway to an intake channel, which channels air from the intake port 360 of the first end of the enclosure 314 to an air filter (not shown in FIGS. 15 and 16) coupled to a second end of the enclosure 314. As shown, the front wall 398, which forms an intake port side of the bulkhead cover 356, faces forward and downward at a negative angle relative to a direction of travel of the vehicle 312 on which the air intake system 310 is included. In the illustrated embodiment, the distal end portion 370a includes an angled lip portion 370b that extends at a positive angle relative to a direction of travel of the vehicle. Also in the illustrated embodiment, the deflector 370 extends from a junction area disposed between the base wall 392 and the front wall 398. A plurality of laterally spaced apart ribs 400 (FIG. 16) can extend along a forward face of the deflector 370 to further inhibit snow, water or other debris from entering the intake port 360.

Figure 17:
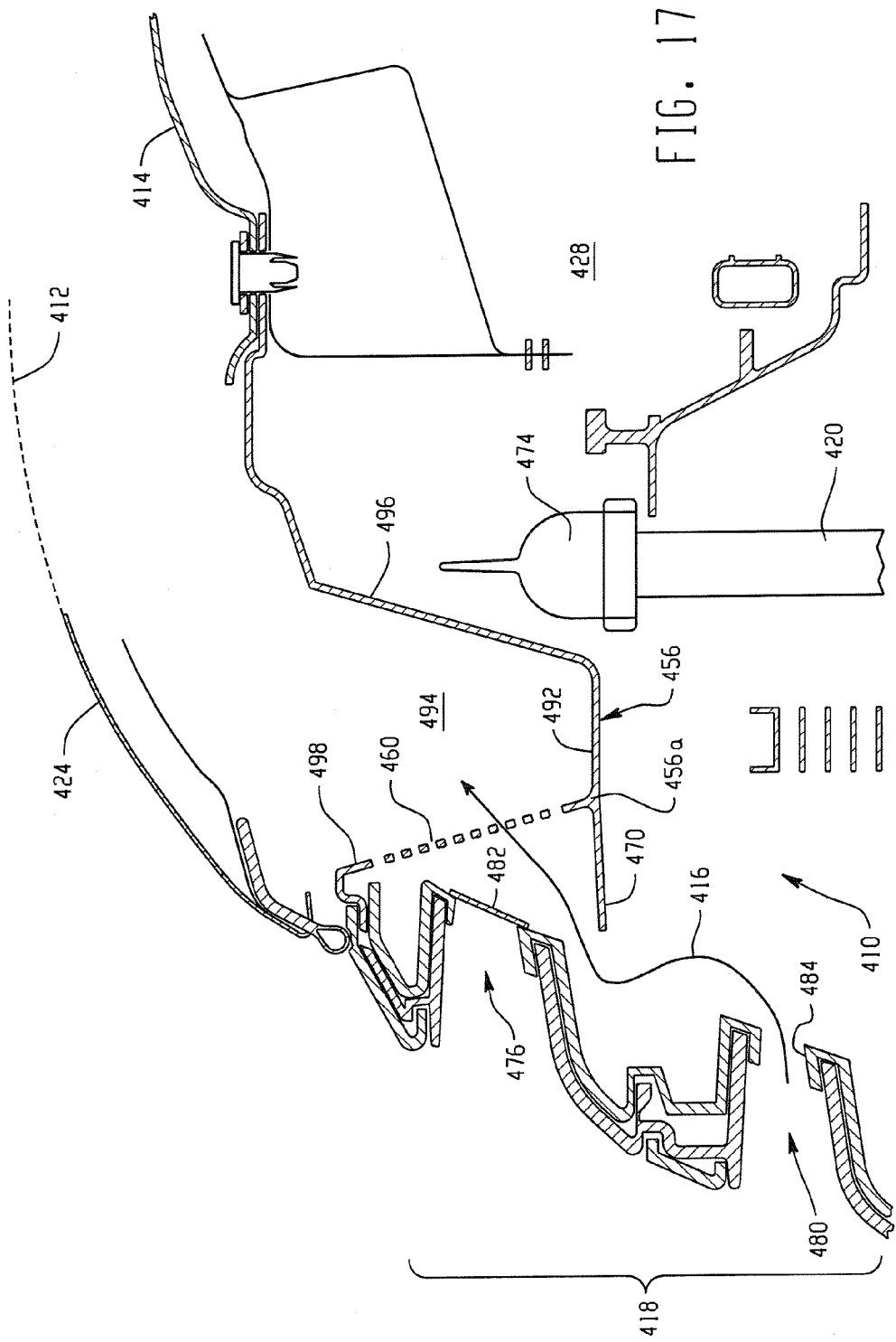
FIG. 17 is a schematic cross sectional view of an automobile or vehicle air intake system according to a fifth embodiment.
Figure 18:
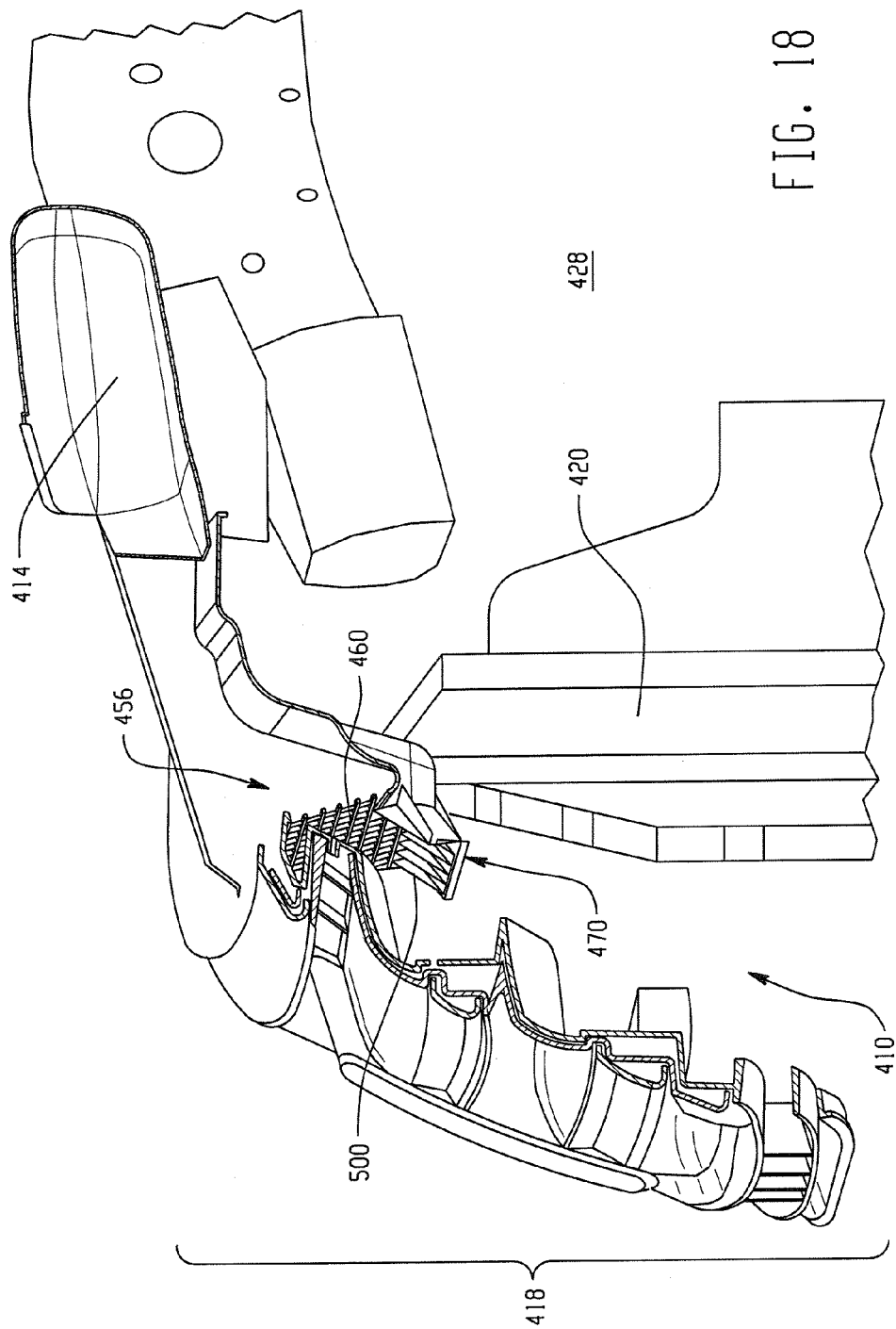
FIG. 18 is an oblique cross sectional view of a portion of the automobile air intake system of FIG. 17.

Referring now to FIGS. 17 and 18, an automobile or vehicle air intake system 410 according to a fifth embodiment is shown. The intake system 410 generally includes aspects of the intake system 310 unless otherwise indicated herein. More particularly, the illustrated air intake system 410 includes a grill 418 disposed along the front portion of an engine compartment 428, a hood 424 disposed over the engine compartment 428, and a bulkhead cover 456 disposed in the engine compartment 428 below the hood 424. The bulkhead cover 456 has or defines a bulkhead cover intake port 460 for receiving intake air for an engine of vehicle 412. An airflow passage 416 extends from the grill 418 to the intake port 460 for delivering airflow received through one or more apertures 484 of the grill 418. The system 410 additionally includes a deflector or extension 470 disposed along and extending forwardly from a lower portion of the intake port 460 to circuitously redirect airflow passing from the grill 418 to the intake port 460. As shown, the deflector 470 of FIG. 17 specifically extends forwardly at an angle substantially parallel to the direction of travel of the vehicle, though this is not required, and circuitously forms the airflow passage 416 for inhibiting liquid and debris from reaching intake port 460. Ribs 500 (FIG. 18) can be provided along the deflector 470 in laterally spaced apart relation to further inhibit water or other debris from entering the intake port 460.

The grill 418 and the deflector 470 define the airflow path 416 as a serpentine airflow path to the intake port 460. Like the bulkhead cover 356, the bulkhead cover 456 can include a screen disposed over the intake port 460 for inhibiting moisture droplets and/or other particles (e.g., snow) from entering into the bulkhead cover 456. More particularly, in the illustrated embodiment, the screen is formed integrally with the bulkhead cover 456 at the intake port 460. The screen can be structurally configured to function the same or similar to the screen 60 of the first embodiment shown in FIGS. 1-8, though this is not required.

Radiator 420 is disposed within the engine compartment 428 below the intake port 460. The radiator at least partially dams airflow entering through the apertures 484 of the grill 418 and redirects the airflow 90° or more (e.g., straight upwardly toward the intake port 460), thus the radiator 420 further defines the serpentine airflow path 416. In the embodiment illustrated in FIGS. 17 and 18, the intake port 460 is disposed forwardly of the radiator 420. The grill 418 has an upper intake portion 476 and a lower intake portion 480. As shown, the upper intake portion 476 is blocked by closure member 482 to prevent airflow from entering the grill 418 therethrough.

The bulkhead cover 456 includes a plurality of walls, including base or base wall 492, a rearward wall 496 and front wall 498, the intake port 460 being defined in the front wall 498. The walls 496,498 and base wall 492 form a deep intake channel 494 for airflow entering the bulkhead cover 456, which can also be referred to as a front trench portion. From the intake channel or trench portion 494, end portions of the walls and the base form the intake port 460 as an entryway to the intake channel for channeling air from the intake port 460 to intake enclosure 414. The grill apertures 484 through which the airflow enters the grill 418 are disposed below and spaced apart vertically from the intake opening 460 and from the deflector 470.

The wall 498 in which the intake port 460 is defined and thus forms an intake port side of the bulkhead cover 456 faces at forward and downward at a negative angle relative to a direction of travel of the vehicle. As shown in FIG. 17, the deflector 470 extends approximately parallel to a direction of travel of the vehicle 412; however, the extension 470 can also extend forwardly and downwardly as shown in FIG. 18 from a lower edge of the intake port 460.

Figure 19:
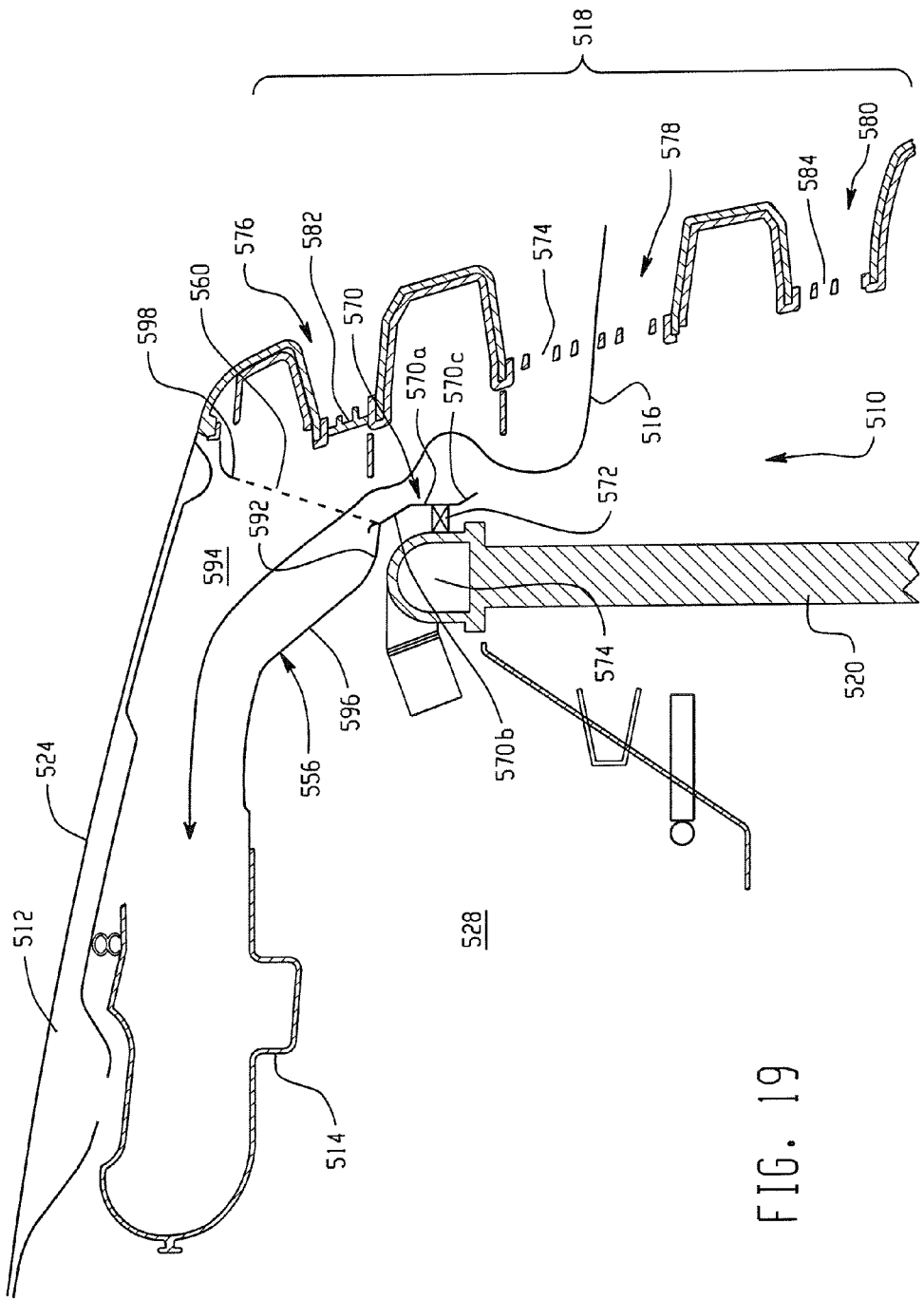
FIG. 19 is a schematic cross sectional view of an automobile or vehicle air intake system according to a sixth embodiment.
Figure 20:
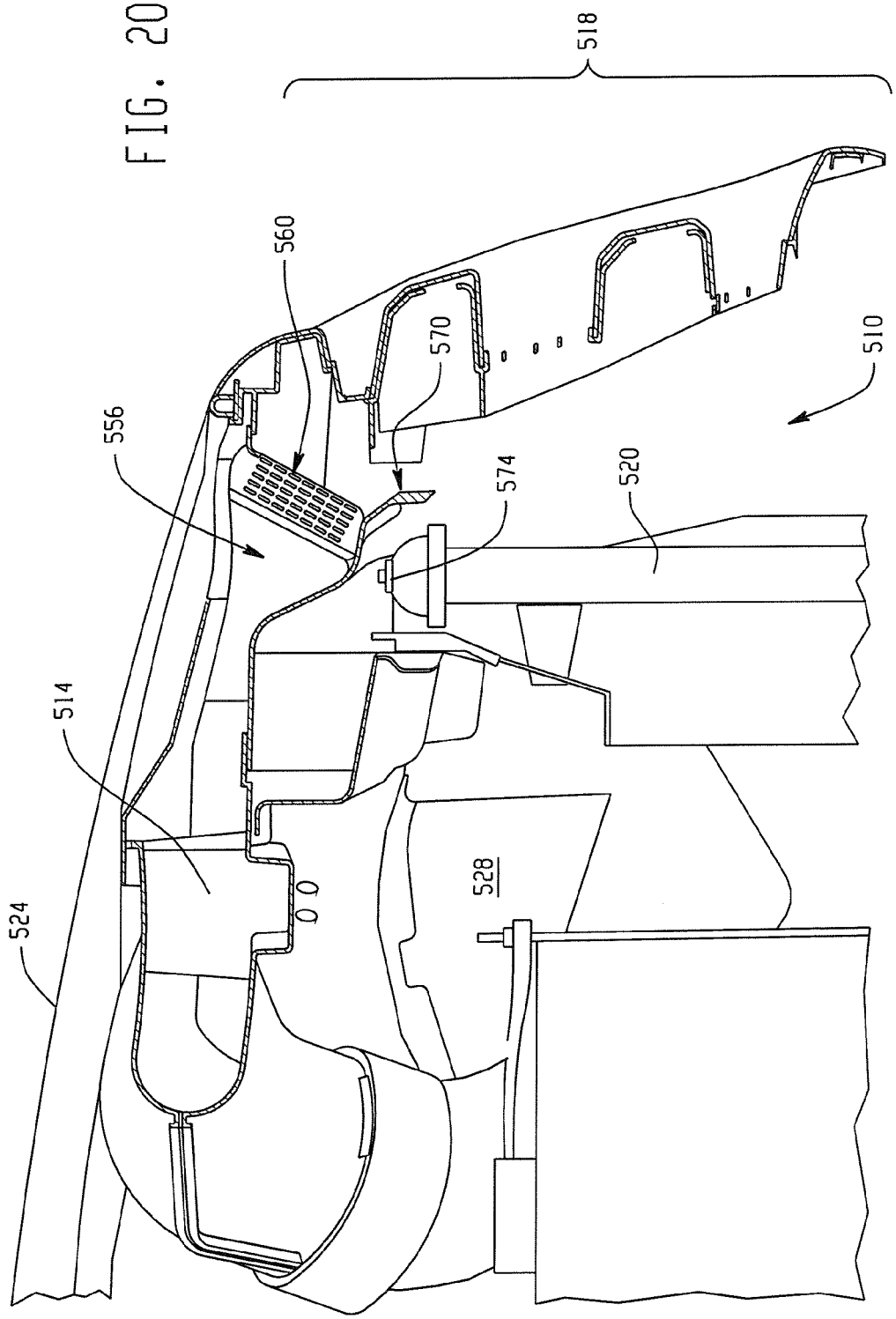
FIG. 20 is an oblique cross sectional view of a portion of the automobile air intake system of FIG. 19.

Referring now to FIGS. 19-20, an automobile or vehicle air intake system 510 according to a sixth embodiment is shown. The intake system 510 can generally include aspects of the intake systems 310 and 410 unless otherwise indicated herein. The intake system 510 includes a grill 518 disposed along a front portion of an engine compartment 528, a hood 524 disposed over the engine compartment 528, and a bulkhead cover 556 disposed in the engine compartment 528 below the hood 524. The bulkhead cover 556 defines an intake port 560 for receiving intake air for an engine of vehicle 512. An airflow passage 516 extends from the grill 518 to the intake port 560 for delivering airflow received through one or more grill apertures 584 to the intake port 560. The bulkhead cover 556 includes a deflector or extension 570 disposed along and extending forwardly from a lower portion of the bulkhead cover 556 to circuitously redirect airflow passing from the grill 518 to the intake port 560. The grill 518 and the deflector 570 define at least a portion of the air path 516 as a serpentine airflow path to the intake port 560.

The air intake system 510 further includes a radiator 520 disposed within the engine compartment 528. The radiator 520 at least partially dams airflow entering through the apertures 584 of the grill 518 and redirects the airflow 90° or more (e.g., straight upwardly toward intake port 560), thus the radiator 520 further forms the airflow path 516 at a serpentine airflow path. In the embodiment illustrated in FIGS. 19 and 20, the bulkhead cover 556 is disposed forwardly of the radiator 520.

As with the intake systems 310 and 410, the bulkhead cover 556 of the intake system 510 can include a screen disposed over or formed across the intake port 560. In the illustrated embodiment, the screen is formed integrally with the bulkhead cover 556. The screen can be structurally configured to function the same or similar to the screen 60 of the first embodiment shown in FIGS. 1-8, though this is not required.

The grill 518 of the embodiment illustrated in FIGS. 19 and 20 is similar to the grill 318 in that it includes an upper intake portion 576, a central intake portion 578 and a lower intake portion 580. The upper intake portion 576 can be blocked with a closure member 582 to prevent airflow from entering the grill 518 therethrough. Thus, airflow enters through the grill 518 only through apertures 584 of the central and lower intake portions 578,580. By this arrangement, the grill apertures 584 are spaced apart vertically below the deflector 570 and are disposed below and spaced apart vertically from the intake opening 560.

In the embodiment illustrated in FIGS. 19 and 20, a portion 570*a* of the deflector 570 is secured to the radiator 520, and more particularly to a cap 574 of the radiator. As shown, a seal 572 can be provided between the portion 570*a* of the deflector 570 and the cap 574 of the radiator 520. The seal 572 substantially prevents airflow entering the grill apertures 584 from passing between the bulkhead cover 556 and the top of the radiator 520. Like the bulkhead cover 456, the bulkhead cover 556 includes a front trench portion 594 defined by base wall 592, rearward wall 596, which extends upward from the base wall 592, and forward wall 598, which is spaced apart from the rearward wall 596 and extends upward from the base wall 592. The forward wall 598 has the intake port 560 defined therein. As shown, the deflector 570 particularly extends from a junction area between the base wall 592 and the forward wall 598. The forward wall 598 forms an intake port side of the bulkhead cover 556 that faces forward and downward at a negative angle relative to a direction of travel of the vehicle 512. Though not illustrated in FIGS. 19 and 20, ribs similar to ribs 400 or 500 could be included along the deflector 570 and spaced apart lateral relation.

The deflector or extension 570 of FIGS. 19 and 20 can include a first portion 570*b* that extends forwardly and downwardly from a lower edge of the intake port 560 (i.e., the edge defined at the junction of the base wall 592 and the forward wall 598), second portion 570*b* (i.e., the portion of the illustrated embodiment secured to the radiator cap 574 by the seal 572), which extends downwardly from a distal end of the first portion 570*a*, and a third portion 570*c* which extends forwardly and downwardly from a distal end of the second portion 570*a*. By this arrangement, as illustrated best in FIG. 19, the airflow path 516 is forced slightly forwardly by the deflector 570 prior to entering the intake port 560.

It will be appreciated that several of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle air intake system, comprising:
   a grille disposed along the front portion of an engine compartment;
   a hood disposed over the engine compartment; and
   a bulkhead cover disposed in the engine compartment below the hood for covering a bulkhead extending laterally across the engine compartment, the bulkhead cover having a bulkhead cover intake port and a deflector disposed along and extending forwardly from a lower portion of the bulkhead cover intake port to circuitously redirect airflow passing from the grille to the bulkhead cover intake port, wherein the bulkhead cover includes a front trench portion defined by a base wall, a rearward wall extending upward from the base wall, and a forward wall spaced apart from the rearward wall and extending upward from the base wall, the forward wall having the bulkhead cover intake port defined therein, the deflector extending from a junction area between the base wall and the forward wall.

2. The vehicle air intake system of claim 1, wherein the grille and the deflector define an airflow path along which the airflow travels as a serpentine airflow path to the bulkhead cover intake port.

3. The vehicle air intake system of claim 2, further comprising a screen through which airflow from the grille passes for inhibiting the flow of water and large particles from entering into the bulkhead cover.

4. The vehicle air intake system of claim 3, wherein the screen is disposed over the bulkhead cover intake port.

5. The vehicle air intake system of claim 4, wherein the screen is formed integrally with the bulkhead cover.

6. The vehicle air intake system of claim 2, further comprising a radiator disposed within the engine compartment below the bulkhead cover intake port, the radiator further forming the serpentine airflow path.

7. The vehicle air intake system of claim 6, wherein a distal end portion of the deflector is secured to the radiator.

8. The vehicle air intake system of claim 2, wherein the airflow path is a vertically circuitous airflow path from the grille to the intake port defined by the grille, the bulkhead, a radiator disposed in the engine compartment, and the hood for substantially all airflow passing from the grille to the intake port.

9. The vehicle air intake system of claim 1, wherein the bulkhead cover includes a plurality of walls that form a deep intake channel, end portions of the walls and the base wall forming the bulkhead cover intake port as an entryway to the intake channel, the deflector formed integrally as part of the bulkhead cover.

10. The vehicle air intake system of claim 1, wherein the airflow from the grille enters the grille through one or more inlet apertures spaced apart vertically below the deflector.

11. The vehicle air intake system of claim 1, wherein the grille has an upper intake portion and a lower intake portion, the upper intake portion is blocked to prevent airflow from entering the grille therethrough.

12. The vehicle air intake system of claim 1, wherein the bulkhead cover has an intake port side in which the bulkhead cover intake port is defined that faces forward and downward at a negative angle relative to a direction of travel of the vehicle, and wherein the deflector extends at an angle substantially parallel to the direction of travel of the vehicle.

13. The vehicle air intake system of claim 1 wherein the deflector includes a plurality of laterally spaced apart ribs extending from a distal end of the deflector to the bulkhead cover intake port.

14. The vehicle air intake system of claim 1 wherein the deflector has a first end attached to the bulkhead cover adjacent the intake port and a second end cantilevered forward of the intake port.

15. An air intake system for a vehicle, comprising:
   a grille disposed along the front portion of the engine compartment and having apertures therein for receiving airflow;
   a hood disposed over the engine compartment;
   a bulkhead cover received in the engine compartment and defining an intake port for receiving intake for an engine of the vehicle, wherein the bulkhead cover intake port has a screen formed thereacross;
   an airflow passage extending from the grille to the bulkhead cover intake port for delivering airflow received through the apertures of the grille to the bulkhead cover intake port; and
   an extension formed integrally with the bulkhead cover and protruding from a lower portion of the bulkhead cover to circuitously form the airflow passage for inhibiting liquid and debris from reaching the intake port.

16. The vehicle air intake system of claim 15, wherein the bulkhead cover includes a front trench portion defined by a base wall, a rearward wall extending upward from the base wall, and a forward wall spaced apart from the rearward wall and extending upward from the base wall, the forward wall having the bulkhead cover intake port defined therein, the deflector extending from a junction area between the base wall and the forward wall.

17. The air intake system of claim 15, further comprising a radiator disposed within the engine compartment, said radiator at least partially damming airflow entering through the apertures of the grille and redirecting the airflow ninety degrees or more.

18. The air intake system of claim 17, wherein the bulkhead cover intake port is disposed forwardly of the radiator.

19. The air intake system of claim 15, wherein the apertures of the grille are disposed below and spaced apart vertically from the bulkhead cover intake port.

20. The air intake system of claim 15, wherein the extension has a first portion extending forwardly and downwardly from a lower edge of the bulkhead cover intake port, a second portion extending downwardly from a distal end of the first portion, and a third portion extending forwardly and downwardly from a distal end of the second portion.

21. The vehicle air intake system of claim 15 further including:
   a bulkhead disposed across a front portion of the engine compartment, the bulkhead cover disposed over the bulkhead;
   a radiator disposed in the engine compartment; and
   wherein the airflow passage extends from the grille through the screen and to the intake port, the airflow path defined by the bulkhead, the radiator, the grille and the hood.

22. A vehicle air intake bulkhead cover, comprising:
   a base;
   a plurality of walls, the walls and the base integrally formed and together forming an airflow channel through the bulkhead cover having a first end in which a bulkhead cover intake port is defined and a second end; and
   a screen integrally formed with the plurality of walls and disposed across the bulkhead cover intake got a deflector integrally formed with the base and the plurality of walls, the deflector protruding from the base below the bulkhead cover intake port to obstruct direct airflow into the bulkhead cover intake port, lateral ends of the deflector terminating adjacent lateral sides of the bulkhead cover intake port.

* * * * *

UNITED STATES PATENT AND TRADEMARK OFFICE
CERTIFICATE OF CORRECTION

| | | |
|---|---|---|
| PATENT NO. | : 8,201,651 B2 | Page 1 of 1 |
| APPLICATION NO. | : 12/755894 | |
| DATED | : June 19, 2012 | |
| INVENTOR(S) | : Clifford Randall Salvesen et al. | |

It is certified that error appears in the above-identified patent and that said Letters Patent is hereby corrected as shown below:

In the Claims:

In col. 16, claim 22, line 43, please remove "got" and replace it with --port;--.

In col. 16, claim 22, line 43, "a deflector integrally formed..." should start on a new line.

Signed and Sealed this
Fourth Day of September, 2012

David J. Kappos
*Director of the United States Patent and Trademark Office*